United States Patent
Sensui et al.

(10) Patent No.: US 12,208,332 B2
(45) Date of Patent: Jan. 28, 2025

(54) VIDEO GAME WITH AUTO OBJECT PLACEMENT MODE

(71) Applicant: NINTENDO CO., LTD., Kyoto (JP)

(72) Inventors: Kazuyoshi Sensui, Kyoto (JP); Masaki Yasuhara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 324 days.

(21) Appl. No.: 17/688,037

(22) Filed: Mar. 7, 2022

(65) Prior Publication Data
US 2023/0018124 A1 Jan. 19, 2023

(30) Foreign Application Priority Data
Jul. 16, 2021 (JP) ................. 2021-118042

(51) Int. Cl.
| A63F 13/50 | (2014.01) |
| A63F 13/57 | (2014.01) |
| A63F 13/69 | (2014.01) |
| G06F 3/04845 | (2022.01) |
| G06F 3/04847 | (2022.01) |

(52) U.S. Cl.
CPC .......... *A63F 13/57* (2014.09); *G06F 3/04845* (2013.01); *G06F 3/04847* (2013.01)

(58) Field of Classification Search
None
See application file for complete search history.

(56) References Cited

U.S. PATENT DOCUMENTS

| 2014/0066199 A1 | 3/2014 | Takagi et al. |
| 2019/0118093 A1* | 4/2019 | Sensui .................... A63F 13/58 |

FOREIGN PATENT DOCUMENTS

| JP | 2014-045821 | 3/2014 |
| JP | 2017-113306 | 6/2017 |
| JP | 2019-076190 | 5/2019 |
| JP | 2020-168381 | 10/2020 |

* cited by examiner

*Primary Examiner* — Lawrence S Galka
(74) *Attorney, Agent, or Firm* — Nixon & Vanderhye P.C.

(57) ABSTRACT

An automatic placement mode is switched between ON and OFF in accordance with a setting parameter value set by a user. The setting parameter value and at least one in-game object is stored in association with each other. When the automatic placement mode is switched to be ON, the in-game object owned by the user, among the in-game objects associated with the setting parameter value, is automatically placed in a virtual space. Then, while the automatic placement mode is ON, if the user newly acquires the in-game object associated with the setting parameter value, this in-game object is automatically placed in the virtual space.

20 Claims, 26 Drawing Sheets

| AREA NAME | PLACEMENT LAYOUT CONTENT |
|---|---|
| CAMPSITE | ... |
| COTTAGE 1ST FLOOR | ... |
| COTTAGE 2ND FLOOR | ... |

| AREA NAME | SET RECIPE ID |
|---|---|
| CAMPSITE | 001 |
| COTTAGE 1ST FLOOR | 000 |
| COTTAGE 2ND FLOOR | 005 |

VIDEO GAME WITH AUTO OBJECT PLACEMENT MODE

CROSS REFERENCE TO RELATED APPLICATION

This application claims priority to Japanese Patent Application No. 2021-118042 filed on Jul. 16, 2021, the entire contents of which are incorporated herein by reference.

FIELD

The present disclosure relates to a processor-readable non-transitory storage medium having an information processing program stored therein, an information processing system, an information processing apparatus, and an information processing method which place a predetermined object in a virtual space.

BACKGROUND AND SUMMARY

Hitherto, game processing that allows a virtual furniture article to be created and placed in a virtual space has been known. As such game processing, there has also been known game processing in which, when making an instruction to place a furniture article, either a manual placement instruction in which a player designates a placement position and the furniture article is placed or an automatic placement instruction in which the furniture article is placed without the player designating a placement position can be designated.

In the above game processing, when making an instruction to place a furniture article, an image indicating a manual placement instruction and an image indicating an automatic placement instruction are displayed, and a user performs an operation for designating either image. Therefore, after a furniture article is manually or automatically placed at a certain timing, when a new furniture article is acquired, it is necessary to make a manual placement instruction or an automatic placement instruction again in order to place the furniture article. That is, each time the user acquires a furniture article and desires to place the furniture article, the user needs to make a manual placement instruction or an automatic placement instruction. In this regard, there is room for improving the convenience of the user.

Therefore, it is an object of the present disclosure to provide a processor-readable non-transitory storage medium having an information processing program stored therein, an information processing system, an information processing apparatus, and an information processing method which can further improve the convenience of a user in terms of placing a predetermined object in a virtual space.

In order to attain the object described above, for example, the following configuration examples are exemplified.

A configuration example is directed to a processor-readable non-transitory storage medium having stored therein an information processing program to be executed by a processor of an information processing apparatus, the information processing program causing the processor to:

when a user acquires in-game objects satisfying a predetermined acquisition condition, store identification information of the user and the in-game objects in association with each other;

place at least a part of the in-game objects associated with the identification information of the user, at a predetermined position in a virtual space, the predetermined position being designated on the basis of a first instruction input of the user;

switch an automatic placement mode between ON and OFF in accordance with a setting parameter value set on the basis of a second instruction input of the user;

store the setting parameter value and at least one of the in-game objects in association with each other;

when the automatic placement mode is switched to be ON, automatically place the in-game object associated with the identification information of the user among the in-game objects associated with the setting parameter value, in the virtual space; and while the automatic placement mode is ON, when the in-game object associated with the setting parameter value is newly associated with the identification information of the user, automatically place the newly associated in-game object in the virtual space.

According to the above configuration example, while the automatic placement mode is ON, when the user acquires the in-game object associated with the setting parameter value, the in-game object is automatically placed in the virtual space. Accordingly, the convenience of the user can be improved.

In another configuration example, a plurality of values may be prepared as the setting parameter value causing the automatic placement mode to be ON. The information processing program may cause the processor to switch the automatic placement mode between ON and OFF in accordance with any one setting parameter value set on the basis of the second instruction input of the user among the plurality of the setting parameter values.

According to the above configuration example, the user can be allowed to use a plurality of placement methods and layouts for the in-game objects. Accordingly, the entertainment characteristics of the game can be improved.

In another configuration example, a predetermined valid period in which it is possible to set the setting parameter value may be associated with each setting parameter value.

According to the above configuration example, for example, the holding period of a predetermined event and the valid period of a setting parameter value can also be set so as to correspond to each other. Accordingly, it is possible to provide motivation to the user to take part in the event. In addition, as for an in-game object acquired by the user during the event, the in-game object can be automatically placed as soon as the game object is acquired. Therefore, for example, it is possible to allow the user to concentrate on playing a game or the like in the event for acquiring the in-game item, and it is also possible to promote the user to more actively take part in the event.

In another configuration example, the information processing program may further cause the processor to perform a first notification on the basis of the setting parameter value causing the automatic placement mode to be ON being newly added and becoming settable by the user.

According to the above configuration example, when a new setting parameter value is created (by a game administrator or the like), the existence of the new setting parameter value can be notified to the user. Accordingly, it is possible to promote the user to use the new setting parameter value.

In another configuration example, the information processing program may further cause the processor to associate the identification information of the user and a user level increasing in accordance with progress of a game; and setting the setting parameter value on the basis of the second instruction input of the user may be limited until the user level becomes equal to or higher than a predetermined value.

According to the above configuration example, setting the automatic placement mode to be ON can be limited until the user level becomes equal to or higher than the predetermined value. Accordingly, an opportunity or period to collect in-game objects can be given to the user, and, after the number of owned in-game objects becomes large to some extent, the user can be allowed to use the function related to the automatic placement mode.

In another configuration example, the information processing program may further cause the processor to, when the automatic placement mode is ON, switch the automatic placement mode to be OFF in accordance with the in-game object being placed on the basis of the first instruction input of the user.

According to the above configuration example, even when the automatic placement mode is ON, if the user manually changes the placement of the in-game object, the automatic placement mode can be set to be OFF. Accordingly, it possible to respect the placement content by the intention of the user.

In another configuration example, the information processing program may further cause the processor to remove the in-game object already placed in the virtual space, when the in-game object is automatically placed in the virtual space when the automatic placement mode is switched to be ON.

According to the above configuration example, it is possible to prevent the in-game object to be automatically placed from being unable to be placed due to overlap of the placement position thereof and the placement position of the currently placed in-game object.

In another configuration example, the information processing program may further cause the processor to, when the in-game object already placed in the virtual space is removed, store a type and a placement position of the removed in-game object in association with the identification information of the user.

According to the above configuration example, when the user desires to return the placement of the in-game object to the placement before the automatic placement, it is possible to easily return the in-game object to the original placement state, so that the convenience of the user can be improved.

In another configuration example, the information processing program may further cause the processor to, when the automatic placement mode is ON, perform a second notification indicating to the user that the automatic placement mode is ON.

According to the above configuration example, the user can be allowed to recognize that the automatic placement mode is ON. Accordingly, for example, when a predetermined event and a setting parameter value are associated with each other, it is possible to provide motivation to the user to take part in the event.

In another configuration example, the information processing program may further cause the processor to, when the automatic placement mode is OFF and the number of the in-game objects associated with the identification information of the user among the in-game objects associated with the setting parameter value is equal to or larger than a predetermined number, perform a first recommendation promoting the user to set the setting parameter value causing the automatic placement mode to be ON.

According to the above configuration example, as for a plurality of in-game objects associated with a predetermined setting parameter value, at the timing when a certain number of such in-game objects are acquired, setting the predetermined setting parameter value can be recommended to the user. Accordingly, at the timing when the function of placing an in-game object by the automatic placement mode is more effectively exerted, it is possible to promote the user to use the function.

In another configuration example, the information processing program may further cause the processor to, when the automatic placement mode is OFF and a proportion of the in-game objects associated with the identification information of the user among the in-game objects associated with the setting parameter value is equal to or higher than a predetermined proportion, perform a second recommendation promoting the user to set the setting parameter value causing the automatic placement mode to be ON.

According to the above configuration example, at the timing when the proportion of owned in-game objects associated with a predetermined setting parameter value becomes large to some extent, setting the predetermined setting parameter value can be recommended to the user. Accordingly, at the timing when the function of placing an in-game object by the automatic placement mode is more effectively exerted, it is possible to promote the user to use the function.

In another configuration example, the information processing program may further cause the processor to, when the automatic placement mode is OFF and a predetermined in-game object among the in-game objects associated with the setting parameter value is associated with the identification information of the user, perform a third recommendation promoting the user to set the setting parameter value causing the automatic placement mode to be ON.

According to the above configuration example, at the time at which the user acquires an in-game object that is to be a main part, among a plurality of in-game objects associated with a predetermined setting parameter value, setting the predetermined setting parameter value can be recommended to the user. Accordingly, it is possible to provide motivation to collect the remaining in-game objects associated with the predetermined setting parameter value.

In another configuration example, the virtual space may include at least a first area and a second area, and the information processing program may cause the processor to place the in-game object at a position in the first area or the second area, said position being designated on the basis of the first instruction input of the user.

According to the above configuration example, it is possible to enjoy placing in-game objects at various locations in the virtual space.

In another configuration example, the information processing program may cause the processor to automatically place the in-game object associated with the identification information of the user among the in-game objects associated with the setting parameter value, in the area associated with the setting parameter value.

According to the above configuration example, it is possible to use different setting parameter values for each of a plurality of locations, and it is possible to enjoy different in-game object placements at each location.

In another configuration example, the information processing program may further cause the processor to: switch an area in the game on the basis of a third instruction input of the user; and when switching to the area associated with the setting parameter value occurs, automatically place the in-game object at a position in the area.

According to the above configuration example, for example, automatic placement can be performed at a timing when the screen transitions to a predetermined area. Accordingly, it is possible to prevent the in-game object from being automatically placed until the timing when the in-game object actually needs to be placed (for example, the timing when the screen in which the in-game object is placed becomes visible to the user).

In another configuration example, the information processing program may further cause the processor to, on the basis of the in-game object being automatically placed in the virtual space, perform a third notification indicating that the in-game object has been automatically placed.

According to the above configuration example, as for an in-game object actually used in automatic placement, it is possible to prevent the user from misrecognizing that the in-game object that should have been acquired disappears without the user recognizing the disappearance.

In another configuration example, the information processing program may further cause the processor to: display at least a part of a plurality of the in-game objects associated with the setting parameter value and any one of a plurality of preview images indicating a placement position thereof; and switch the preview image to another preview image that is different from the preview image and in which the number of the in-game objects shown is at least larger than that in the preview image.

According to the above configuration example, it is possible to present a state where the placement content is completed stepwise to the user by using a plurality of preview images. Accordingly, for example, it is possible to allow even a user who owns a small number of in-game objects to enjoy the game while maintaining expectations for the completion of the placement content.

In another configuration example, the information processing program may further cause the processor to: make a connection with a game server; and acquire a new setting parameter value and information about an in-game object associated with the setting parameter value, from the game server. Furthermore, the game server may limit a period in which it is possible for the processor to acquire the information, to a predetermined period.

In another configuration example, the information processing program may further cause the processor to, when the automatic placement mode is OFF and it becomes possible to set the setting parameter value causing the automatic placement mode to be ON from among values equal to or larger than a predetermined number, perform a fourth recommendation promoting the user to set the setting parameter value causing the automatic placement mode to be ON.

According to the above configuration example, it is possible to promote the user to set the setting parameter value.

According to the exemplary embodiments, it is possible to further improve the convenience of the user in terms of placing the predetermined object in the virtual space.

DETAILED DESCRIPTION OF NON-LIMITING EXAMPLE EMBODIMENTS

Figure 1:
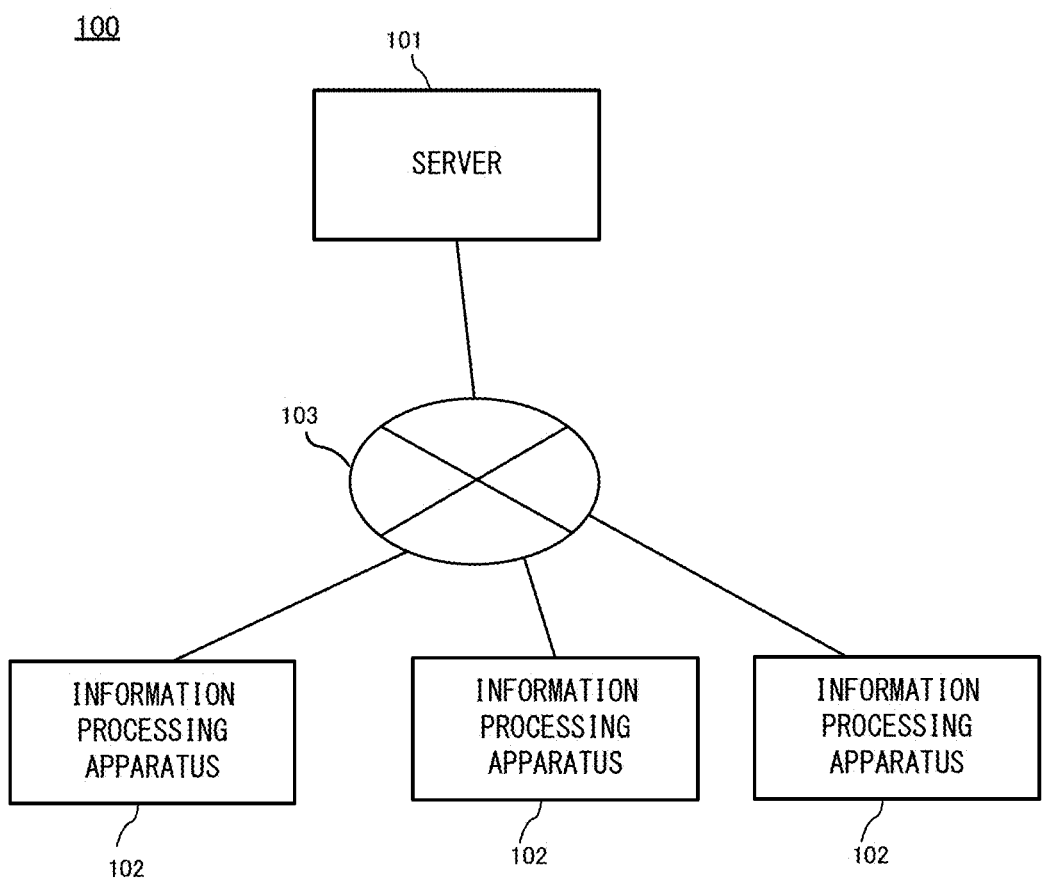
FIG. 1 is a schematic diagram showing a non-limiting example of the entire structure of an information processing system according to an exemplary embodiment.

Hereinafter, one exemplary embodiment will be described. It is to be understood that, as used herein, elements and the like written in the singular form with the word "a" or "an" attached before them do not exclude those in the plural form. FIG. 1 is a schematic diagram showing the entire structure of an information processing system according to the exemplary embodiment. The information processing system 100 according to the exemplary embodiment includes a server 101 and a plurality of information processing apparatuses 102. Each information processing apparatus 102 is, for example, a smartphone, a stationary or hand-held game apparatus, a tablet terminal, a mobile phone, a personal computer, a wearable terminal, or the like. The server 101 and the information processing apparatuses 102 are configured to be able to communicate with each other via the internet 103.

In the exemplary embodiment, information processing is executed with such a configuration, and game processing will be described as an example of the information processing below. Specifically, a game program is installed on the information processing apparatuses 102, and game processing is executed while communication is being performed with the server 101 as appropriate.

Hardware Configuration of Server

Figure 2:
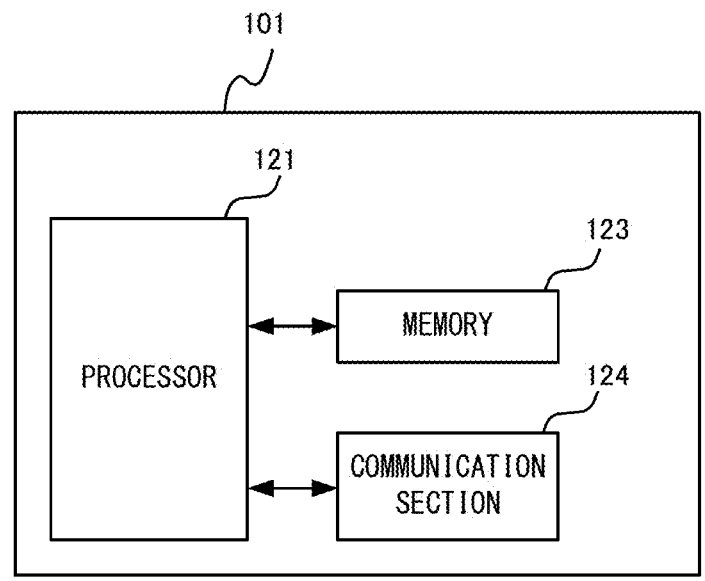
FIG. 2 is a block diagram showing a non-limiting example of the configuration of a server 101.

Next, the hardware configuration of the server 101 will be described. FIG. 2 is a functional block diagram of the server 101. The server 101 includes at least a processor 121, a memory 123, and a communication section 124. The processor 121 executes various programs for controlling the server 101. In the memory 123, various programs to be executed by the processor 121 and various kinds of data to be used by the processor 121 are stored. The communication section 124 connects to a network by means of wired or wireless communication and transmits/receives predetermined data to/from the information processing apparatuses 102 or another server (not shown).

Hardware Configurations of Information Processing Apparatuses

Figure 3:
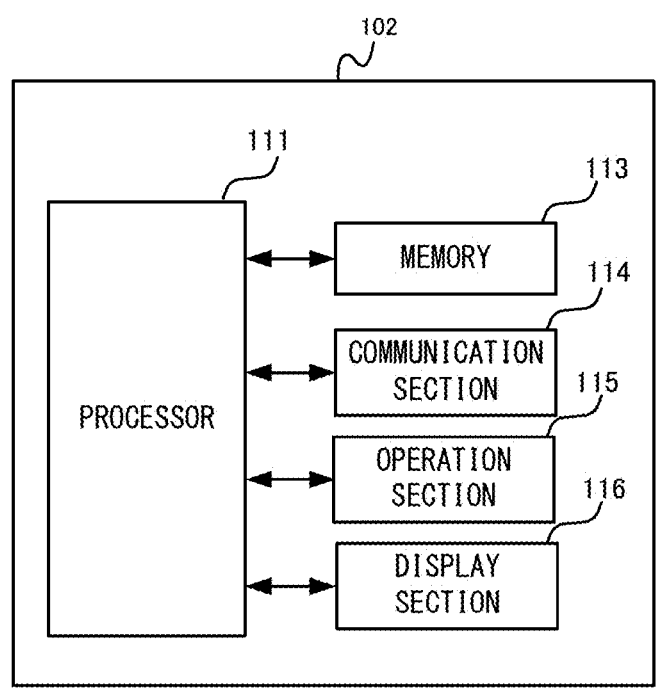
FIG. 3 is a block diagram showing a non-limiting example of the configuration of an information processing apparatus 102.

Next, the hardware configuration of each information processing apparatus 102 will be described. FIG. 3 is a functional block diagram of the information processing apparatus 102. In FIG. 3, the information processing apparatus 102 includes a processor 111, a memory 113, a communication section 114, an operation section 115, and a display section 116. The processor 111 executes later-described information processing or executes a system program (not shown) for controlling overall operation of the information processing apparatus 102, thereby controlling operation of the information processing apparatus 102. The processor 111 may include a single processor or a plurality of processors. In the memory 113, various programs to be executed by the processor 111 and various kinds of data to be used in the programs are stored. The memory 113 is, for example, a flash EEPROM or a hard disk device. The communication section 114 connects to the network by means of wired or wireless communication and transmits/receives predetermined data to/from the server 101. The operation section 115 is an input device for accepting an operation from a user. The display section 116 displays an image generated by the information processing executed by the processor 111. The display section 116 may be a display device (for example, a liquid crystal display device) integrally provided with the information processing apparatus 102, or may be a display device separate from the information processing apparatus 102. The exemplary embodiment will be described with a liquid crystal display device integrally provided with the information processing apparatus 102, as an example of the display section 116, and with a touch panel integrated with a liquid crystal screen, as an example of the operation section 115.

Outline of Processing in Exemplary Embodiment

Next, the outline of game processing executed by the information processing system according to the exemplary embodiment will be described. As the game processing, game processing in which a placement item which is a kind of in-game object and which is acquired by the user in the game is placed within a predetermined area in a virtual space, is executed. The predetermined area is, for example, a player character's own room or the like. The placement item is a virtual object for the interior or decoration of the predetermined area. More specifically, the placement item is a virtual object representing a furniture article, a home appliance, an interior decoration, a fence, a partition, or the like. Then, a game in which the user enjoys decoration (customization) of the room or the like by acquiring these items in the game and placing the items within the predetermined area in the virtual space, is executed.

The outline of the game assumed in the exemplary embodiment will be more specifically described. The game assumed in the exemplary embodiment is a game in which a user virtually lives as a player character in a virtual game world in which various virtual characters live. The virtual game space includes a plurality of areas. In each area, character objects (hereinafter, NPCs) other than the player character are placed, and the player character can interact with these NPCs by moving to each area. In this game, a predetermined map screen (not shown) is used for movement between each area. Each area is displayed on the map screen, and by designating a destination area, the user can move to that area.

The user can acquire the above placement item by satisfying a predetermined acquisition condition. For example, the user can acquire a predetermined placement item by satisfying an acquisition condition of creating a placement item in the game. Specifically, in each area, materials for creating the placement item are placed. The user can move to each area and acquire the materials. In addition, it is also possible to acquire the materials by interacting with the above NPCs. Then, the user can acquire the placement item by creating the placement item using these acquired materials.

As another acquisition condition, the user can also acquire a placement item by being selected as a result of a predetermined random selection process. By executing a predetermined random selection process in the game, it is also possible for the user to acquire a placement item (finished product) as a prize for the random selection.

Here, in the exemplary embodiment, the plurality of areas include two types of areas, a placement target area and a non-placement target area. The placement target area is an area in which the placement item can be placed. The non-placement target area is an area other than the placement target area. In addition, as each of the placement target area and the non-placement target area, there can be a plurality of areas. In the exemplary embodiment, a campsite area and a cottage area are assumed as examples of the placement target area. Furthermore, the cottage area includes a 1st floor area and a 2nd floor area. Therefore, in the exemplary embodiment, a description will be given with an example in which there are three areas, a campsite area, a cottage 1st floor area, and a cottage 2nd floor area, as placement target areas.

Next, a method for placing the placement item will be described. In the exemplary embodiment, a dedicated screen (alteration screen described later) for placing placement items is prepared. By performing a predetermined operation on this screen, the user can place a placement item owned by the user, in a predetermined posture (orientation) at a predetermined position within a placement area. Hereinafter, such a placement method based on an operation of the user is referred to as "manual placement".

Furthermore, in the exemplary embodiment, in addition to the above manual placement, it is possible to automatically place a placement item owned by the user, within a placement target area by satisfying a predetermined condition. Hereinafter, such a placement method is referred to as "automatic placement". Describing the automatic placement more specifically, first, in the exemplary embodiment, data that defines a placement content of each placement item is prepared in advance. When the automatic placement is executed, this data is referred to, and the placement item is automatically placed at a predetermined position on the basis of the content defined therein. In other words, this data is data having a meaning of a placement drawing of placement items or a completed drawing. In the exemplary embodiment, such data is referred to as a "recipe" (in another exemplary embodiment, such data may be referred to as a design drawing, a placement completion drawing, etc.). The recipe is created by a game administrator (in some cases, the content thereof is changed). In addition, as for the recipe, there may be a plurality of kinds of recipes. In each recipe, at least information that designates one of the above three placement target areas, information that specifies placement items to be placed therein, and information about the placement position and placement posture of each placement item are defined. The user can "set (enable)" any one recipe for each of the above three placement target areas. When the user performs an operation for setting a recipe, automatic placement of a placement item owned by the user at the time at which the recipe is set, among the placement items specified by this recipe, is performed (if the player character is not present in the placement target area when the recipe is set, the automatic placement is performed when the screen transitions to the placement target area). Moreover, while the recipe is currently set, if the user acquires later a placement item (included in the recipe) that is not owned by the user at the time at which the recipe is set, this placement item acquired later is automatically placed at a predetermined position on the basis of this recipe. For example, it is assumed that there is a "recipe A" for the campsite area, and the recipe A includes an item A and an item B. Then, it is assumed that the user sets the recipe A with respect to the campsite area in a state where the user owns only the item A. In this case, at the time at which an operation for setting the recipe A is performed, automatic placement based on the owned state at that time is performed. Then, after the recipe A is set, if the user acquires the item B later, the item B is automatically placed at a predetermined position in the campsite area on the basis of the recipe A. As for the timing when an automatic placement process is performed, in the exemplary embodiment, an example in which the automatic placement process is executed at a timing of screen transition (from another screen) to the placement target area will be described. By such automatic placement, the user can place the item B without performing any special operation for placing the item B (while the recipe A is set) as soon as the user acquires the item B, so that the convenience of the user can be enhanced. In the following description, the recipe setting state is sometimes indicated by ON/OFF of an "automatic placement mode". Specifically, it is assumed that in a state where a recipe is currently set, the automatic placement mode is ON, and in a state where no recipe is set, the automatic placement mode is OFF.

Here, supplementary description will be given regarding the recipe. First, a method for acquiring the recipe will be described. In the exemplary embodiment, it is assumed that the recipe is distributed to all users of the game of the exemplary embodiment. The recipe is created at a predetermined timing (by the game administrator or the like). Then, the created recipe is registered in the server 101, and distribution of the recipe to each user (information processing apparatus 102) is started at a predetermined timing. In addition, the recipe has a valid period. For example, the case where an event in which a predetermined distribution item group is available is held for a limited time, is assumed. In this case, the game administrator may create a recipe using the predetermined distribution item group, and may set a valid period according to the holding period of the event. Then, the game administrator may start distributing the recipe to all users at the start timing of the event. Accordingly, it is possible to enhance the feeling of the event to raise the mood of the user or to promote the user to take part in the event. When the valid period has passed, the setting of the recipe that is currently set is automatically canceled. That is, the automatic placement mode is automatically switched from ON to OFF.

As for the cancellation of the recipe setting, in addition to automatic cancellation due to the end of the valid period set for the recipe as described above, the recipe setting can also be cancelled in the following cases. First, in a detailed setting screen described later, when the user performs an operation for canceling a recipe that is currently set, the recipe setting is cancelled. In addition, when the user manually changes the placement layout at that time in a placement target area for which a recipe is currently set (the automatic placement mode is ON) (then when this change is confirmed), the setting of the recipe that has been set for the placement target area is automatically cancelled. This is intended to prioritize and respect the placement layout changed by the intention of the user.

Furthermore, in the exemplary embodiment, the timing when it is possible to use a function of setting the above-described recipe is limited. Specifically, in this game, a "user level" which increases according to the progress status of the game of each user is set. Then, when the user level is equal to or higher than a predetermined level, it is possible to use the function of setting the above-described recipe. That is, a user who has just started the game cannot use the function of automatic placement by recipe setting as described above. This is intended to increase the motivation of the user for the game by setting, as a kind of a goal to be achieved, "making it possible to use the automatic placement function", while making the user get accustomed to the game through a manual placement operation for a certain period after the game starts. When the user performs an operation to use the recipe setting function when the user level is insufficient, it may be notified that the level is insufficient and the recipe setting function cannot be used.

Screen Examples of Game

Figure 4:
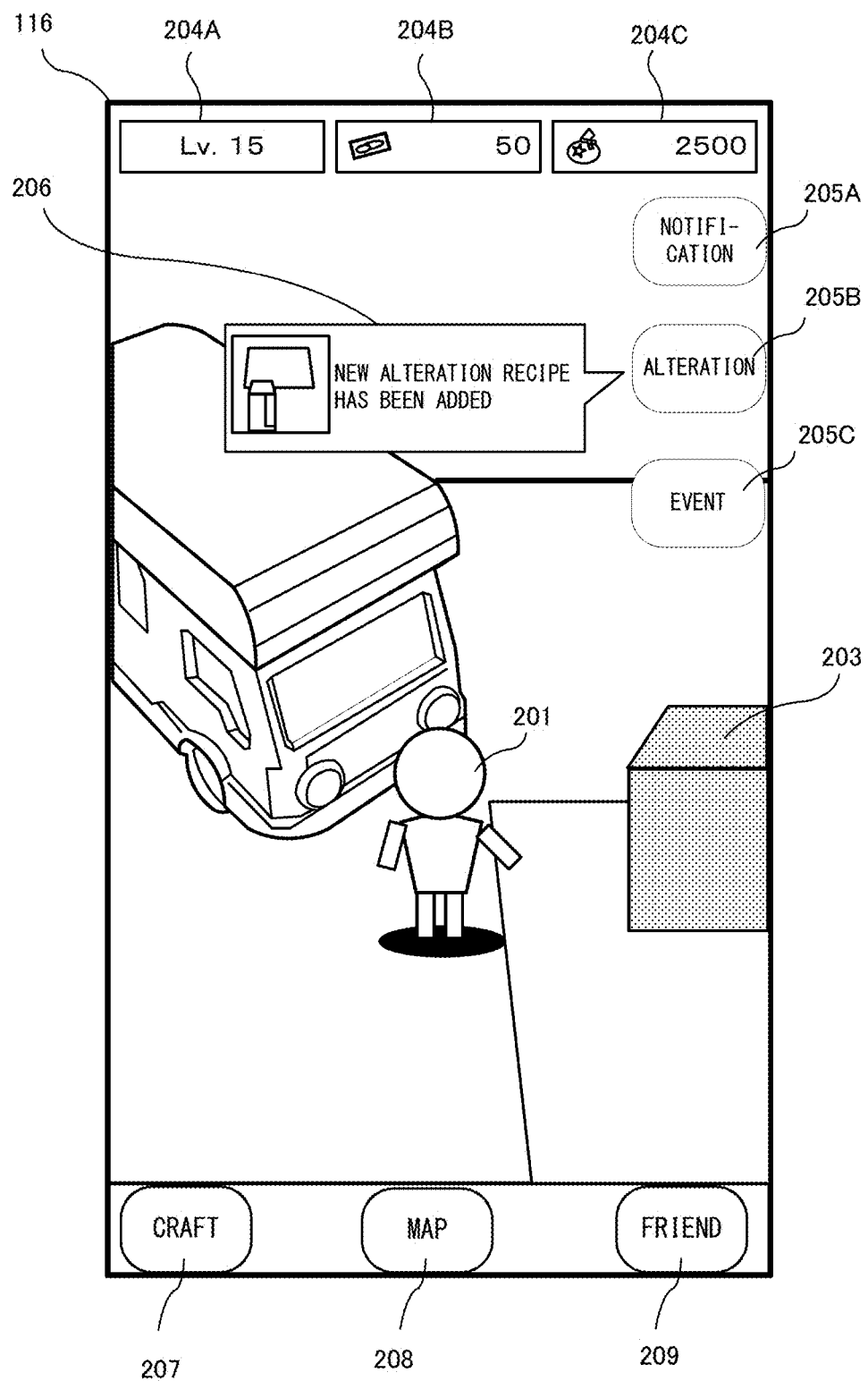
FIG. 4 illustrates a non-limiting screen example of a game of the exemplary embodiment.

Next, an example of screens and operations related to placement of the placement item in the exemplary embodiment will be described with reference to FIG. 4 to FIG. 17. FIG. 4 illustrates a game screen example in the case where a player character 201 which is a virtual object to be operated by the user moves to the campsite area. Hereinafter, a screen in which the player character 201 is present in a predetermined area is referred to as an "area screen". The area screen (of the campsite area) shown in FIG. 4 shows a state where the player character 201 and a placement item 203 exist in the virtual game space. In addition, status displays 204A to 204C are displayed at an upper part of the area screen. These status displays 204A to 204C indicate the user level and the numbers of owned in-game virtual currencies (2 types). Moreover, icons 205A to 205C are displayed at a right part of the area screen. By performing a tap operation on the icon 205A, the user can display a notification (notification from the administrator) or the like for the game. In addition, by performing a tap operation on the icon 205C, the user can display information about an event that is held at that time, or can transition to a predetermined event screen. As for the icon 205B, the user can transition to an "alteration screen" described later, by performing a tap operation on the icon 205B. In addition, as for the icon 205B, a balloon type notification 206 is displayed in a manner in which the relationship with the icon 205B can be recognized. Moreover, a craft button 207 for transitioning to a screen in which a placement item can be created, a map button 208 for transitioning to the map screen for moving to another area, and a friend button 209 for transitioning to a screen regarding a so-called "friend" function are also displayed at a lower part of the area screen.

Here, the content notified by the above balloon type notification 206 will be described. In the balloon type notification 206, information about a recipe is mainly notified. For example, the following contents are notified.

(1) When the user level reaches a level at which it is possible to use a recipe, it is notified that it becomes possible to use a recipe. This is intended to inform the user of the existence the automatic placement function as described above and to promote the user to use the automatic placement function.

(2) When a newly distributed recipe is received from the server 101, it is notified that the new recipe has been added. The balloon type notification 206 shown in FIG. 4 is an example of this case. The content of the notification in this case includes, in addition to a text indicating the above, a thumbnail image indicating the content of the recipe.

(3) While a recipe is currently set, when a placement item is automatically placed, it is notified that the placement item has been automatically placed. If there is no such notification, there is a risk of giving the user a misunderstanding that a distribution item that should have been acquired disappears without the user being aware of the disappearance. Therefore, such a notification is given.

Figure 5:
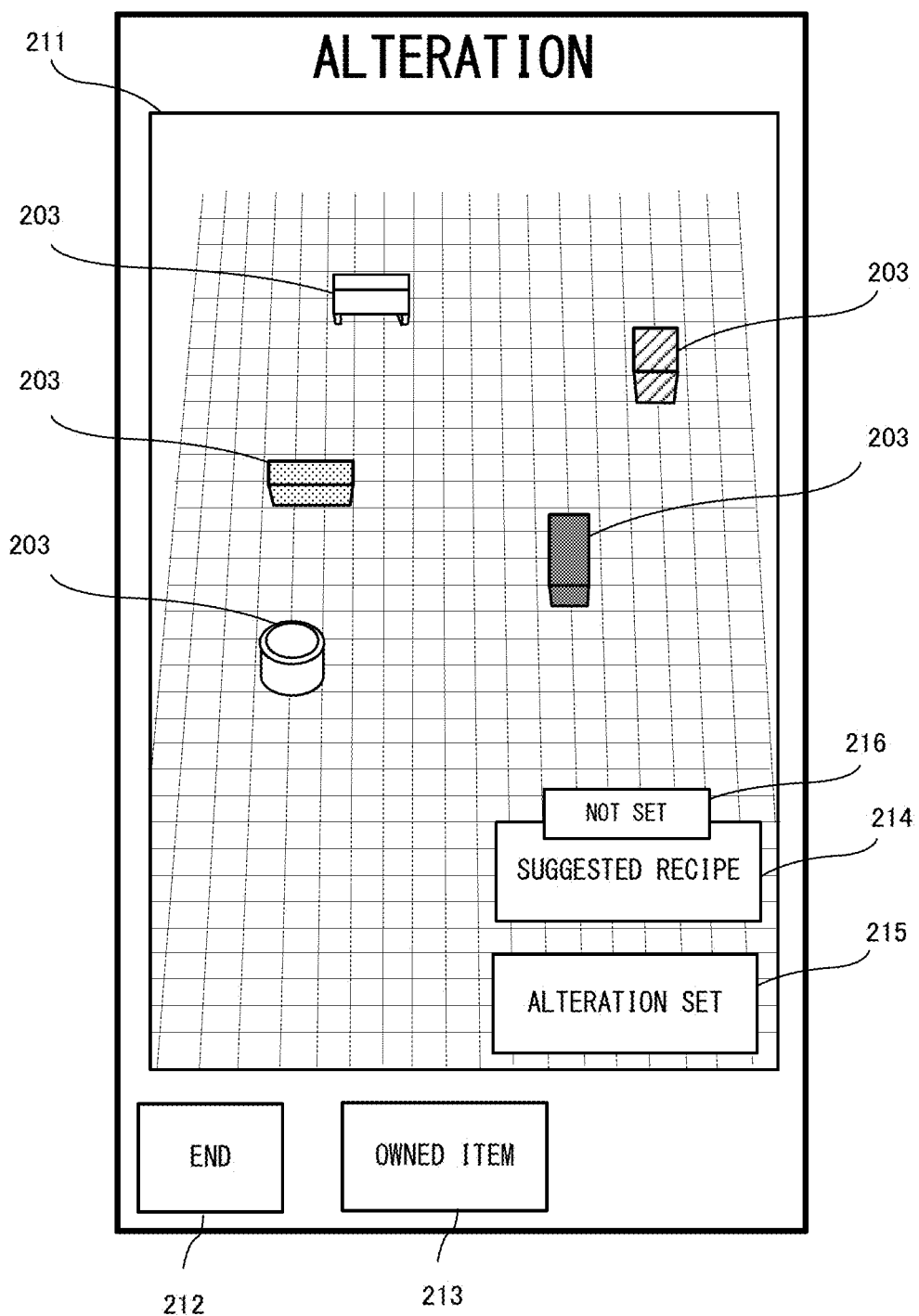
FIG. 5 illustrates a non-limiting screen example of the game of the exemplary embodiment.

Next, an "alteration screen" to which transition can be made by the user performing a tap operation on the icon 205B will be described. FIG. 5 is an example of the alteration screen. In the alteration screen, an edit region 211, an end button 212, and an owned item button 213 are displayed. In the edit region 211, a screen obtained by looking down upon the placement target area (in this case, the campsite area) from above at a slight angle is displayed. In addition, a plurality of placement items 203 already placed within the placement target area are also displayed. In the example of FIG. 5, five placement items 203 are shown.

Moreover, a "suggested recipe" button 214 and an "alteration set" button 215 are displayed at a lower right part in the edit region 211.

The placement position of each placement item 203 displayed in the edit region 211 can be changed by the user performing, for example, a drag operation thereon. In addition, as for placement items that have not been placed, a list (not shown) of placement items owned by the user at that time is displayed by the user performing a tap operation on the owned item button 213. The user can designate a placement item 203 that the user desires to place, from the list, and place the designated placement item 203 at a desired position. In the exemplary embodiment, a grid-like guide display is also displayed in a region (ground portion) where a placement item 203 can be actually placed within the placement target area. The user can place a predetermined placement item 203 at a desired position while referring to this guide display.

By the user performing a tap operation on the end button 212, the placement content at that time can be stored, and (processing related to) the alteration screen can be terminated.

Meanwhile, in the exemplary embodiment, information (hereinafter, referred to as placement layout) about the placement position and the posture of the placed placement items 203 can be registered in an "alteration set" which is data that can include a plurality of the placement layouts, and a predetermined placement layout can be opened as needed. The "alteration set" button 215 is a button for transitioning to a predetermined screen (not shown) for registering (storing) in or reading from such an alteration set. The user can register a placement layout in the alteration set, or can read a placement layout from the alteration set, by performing a predetermined operation on this screen.

Figure 6:
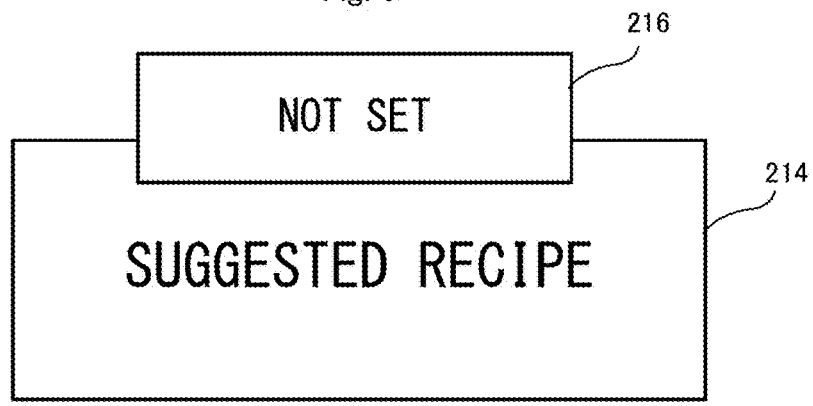
FIG. 6 is a diagram showing a non-limiting screen example of the content notified by a recipe-related notification 216.
Figure 7:
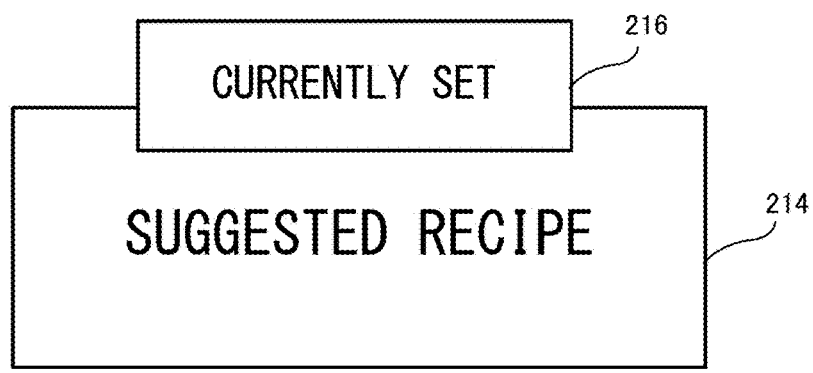
FIG. 7 is a diagram showing a non-limiting screen example of the content notified by the recipe-related notification 216.
Figure 8:
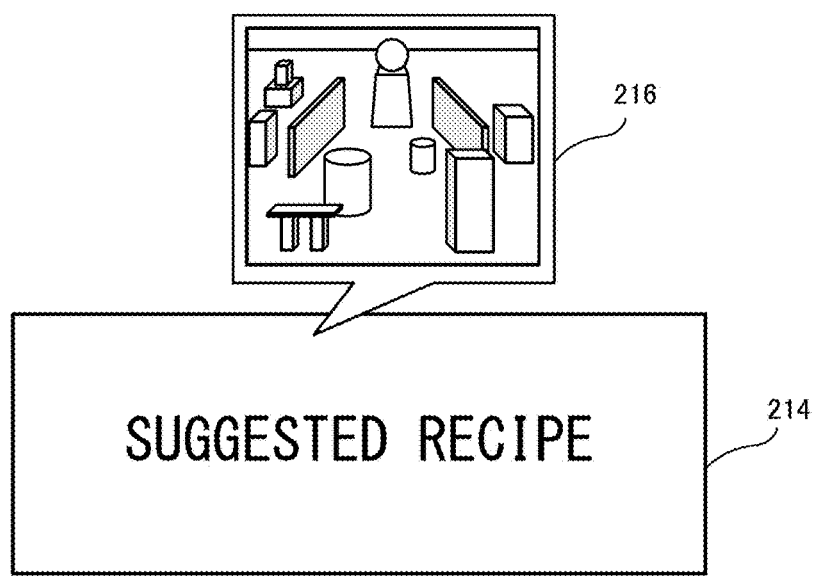
FIG. 8 is a diagram showing a non-limiting screen example of the content notified by the recipe-related notification 216.

The "suggested recipe" button 214 is a button for transitioning to a "recipe setting screen" for selecting and setting the recipe as described above. Here, the recipe-related notification 216 is also displayed so as to be superimposed on the upper side of the "suggested recipe" button 214. Before the recipe setting screen is described, the recipe-related notification 216 will be described. In the recipe-related notification 216, information about the recipe is notified. FIG. 6 to FIG. 8 are each a diagram showing an example of the content notified by the recipe-related notification 216. In the exemplary embodiment, first, a notification indicating whether or not a predetermined recipe is currently set for the placement target area (the campsite area in this example) in which the player character 201 is currently located, is displayed in the recipe-related notification 216. Specifically, when a recipe has not been set, a text "not set" is displayed in the recipe-related notification 216 as shown in FIG. 6. On the other hand, when a predetermined recipe is set, a text "currently set" is displayed in the recipe-related notification 216 as shown in FIG. 7. While a recipe is set, by notifying that the recipe is set as described above, the user is allowed to recognize whether or not any recipe is currently set. In particular, when an event for a limited time and a recipe are associated with each other, it is possible to make the user recognize that the recipe is currently set and to promote the user to more actively take part in the event.

Furthermore, in the exemplary embodiment, a predetermined recipe is selected as a "recommended recipe" and displayed in the recipe-related notification 216. Specifically, as shown in FIG. 8, the recipe-related notification 216 is made into a balloon shape, and a preview image which is a completed form of the recommended recipe is displayed. At this time, for example, a text "Why don't you use this recipe?" or the like may also be displayed together. The recommended recipe is displayed when there is a recipe that newly satisfies a recommendation condition. In addition, after the start of display of the recommended recipe, the recommended recipe is automatically hidden when 2 seconds elapse (then, the display form is changed to the display form as shown in FIG. 6 or FIG. 7). In addition, the number of times of the display is only one, and if the recommended recipe is displayed once in this screen and then hidden, the recommended recipe is not displayed again thereafter.

Next, conditions for being set as the recommended recipe will be described. In the exemplary embodiment, the following three conditions are defined, and one of these conditions is set as a recommendation condition for each recipe.

(Condition A) When a predetermined number or more of placement items specified by the recipe become owned, a recommendation is made. For example, the number of placement items specified by the recipe is 15, and when seven or more of these placement items become owned (regardless of the contents thereof), a recommendation is made.

(Condition B) When a predetermined proportion or more of placement items in the total number of placement items specified by the recipe become owned, a recommendation is made. For example, when 50% or more of placement items in the total number of placement items specified by the recipe become owned, a recommendation is made.

(Condition C) When an item designated as the condition C, among the placement items specified by the recipe, becomes owned, a recommendation is made. For example, for a certain recipe, a "placement item A" is designated as a "key item". Then, when the user acquires the "placement item A", this recipe is recommended.

The recommended recipe may be notified only when the automatic placement mode is OFF, or may be notified regardless of the state of the automatic placement mode. In particular, in the former case, it is possible to promote the user to try using the recipe itself and to provide motivation to actually use the recipe. Separately from this, it may be possible to set the notification function itself to be ON or OFF.

Figure 9:
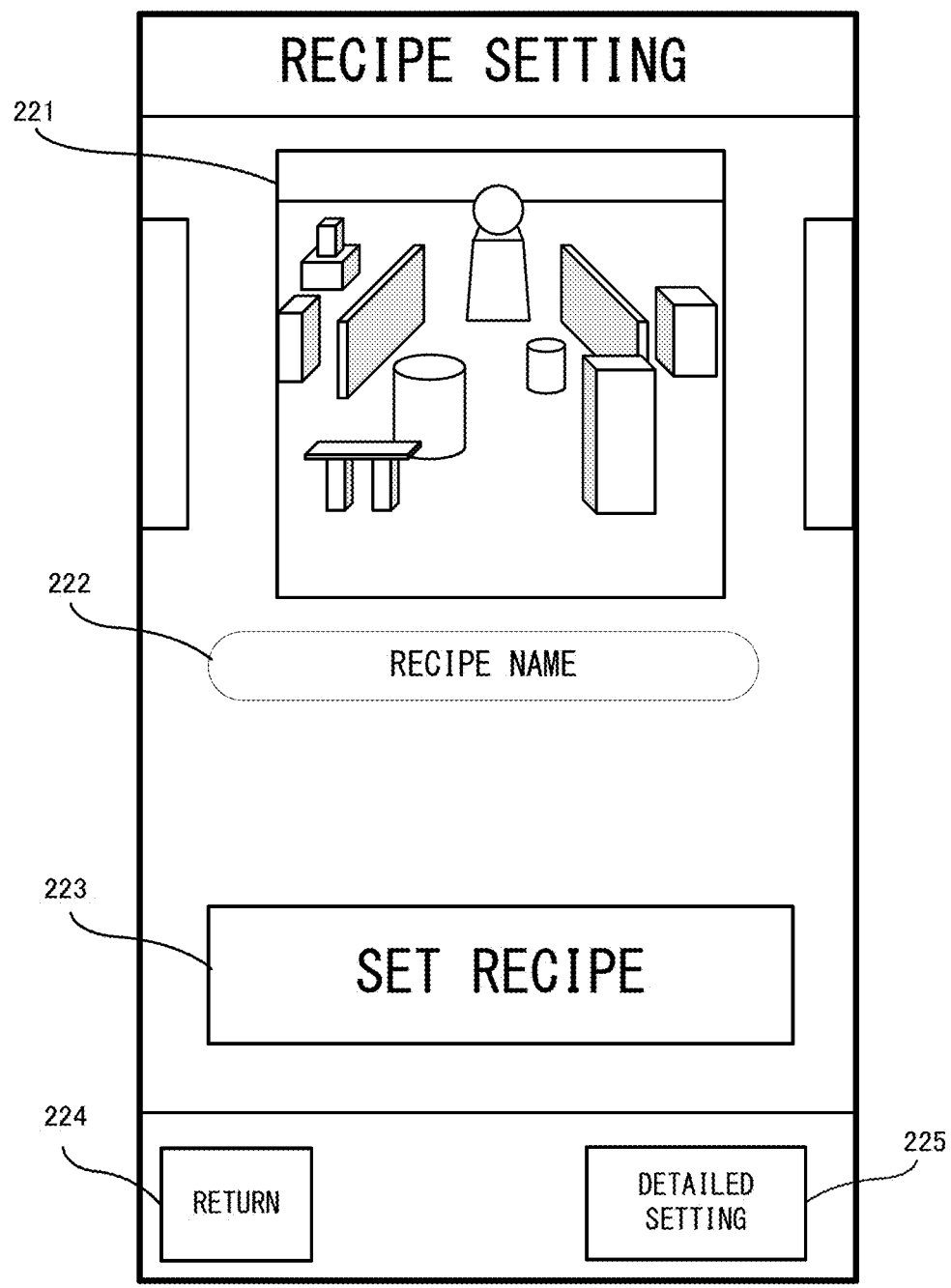
FIG. 9 illustrates a non-limiting screen example of the game of the exemplary embodiment.
Figure 10:
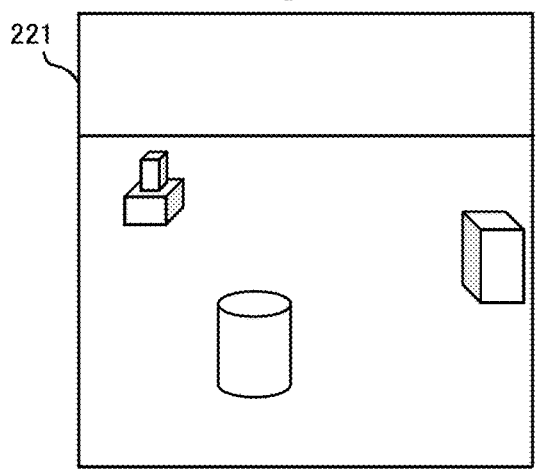
FIG. 10 illustrates a non-limiting display example of a preview image.
Figure 11:
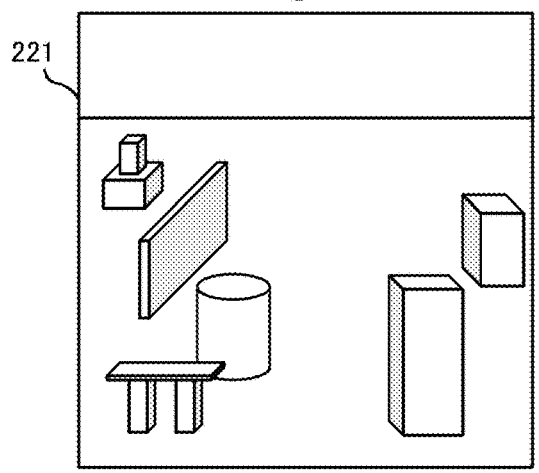
FIG. 11 illustrates a non-limiting display example of the preview image.
Figure 12:
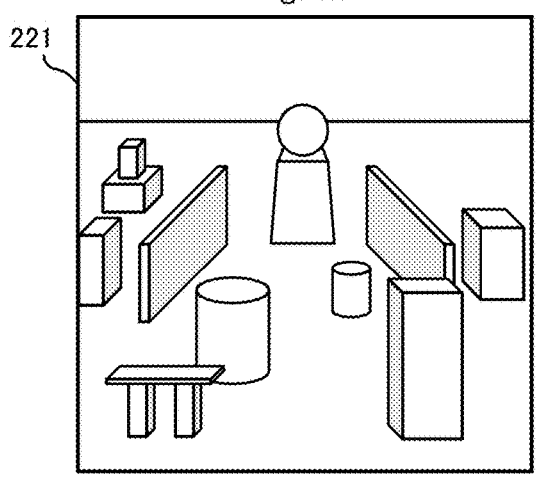
FIG. 12 illustrates a non-limiting display example of the preview image.

Next, the above-described recipe setting screen will be described. When the user performs a tap operation on the "suggested recipe" button 214 in FIG. 5, a recipe setting screen is displayed as shown in FIG. 9. In the recipe setting screen, a preview image 221, a recipe name display 222, a recipe setting button 223, a return button 224, and a detailed setting button 225 are displayed. The recipe name display 222 is an image showing the name of a predetermined recipe, and the preview image 221 is a preview image showing the state of the placement target area when the placement items specified by the recipe are actually placed. Here, as for the preview image, not only one image is prepared for one recipe, but a plurality of images are prepared for one recipe. These images are switched and displayed in the order in which a placement layout is completed stepwise. For example, the case where the number of placement items specified by a certain recipe is 10 (in other words, the specified 10 placement items are required to complete the placement layout of this recipe) is assumed. In this case, as the preview image 221, for example, three images shown in FIG. 10 to FIG. 12 are prepared in advance. FIG. 10 illustrates a first image showing a state where only three of the 10 placement items are placed. FIG. 11 illustrates a second image showing a state where six of the 10 placement items are placed. FIG. 12 illustrates a third image showing a state where all the 10 placement items are placed. Then, as for the display content of the preview image 221, display control is performed such that the three images are switched in the order of the first image, the second image, and the third image. That is, display control is performed such that the number of placement items in the preview image 221 gradually increases. In this regard, only the completed form may be displayed as the preview image 221, but by presenting to the user how the layout gradually approaches the completed form using the plurality of images as in the exemplary embodiment, the user is allowed to have a more specific image for completion. By having a more specific image as described above, for example, a user who owns a small number of placement items that are specified by the recipe can be expected to be more motivated to complete the layout.

Referring back to FIG. 9, by the user performing a right/left slide operation on the display region of the preview image 221, it is possible to switch the displayed recipe to another recipe (if there are a plurality of recipes that can be used at that time). In addition, when the user performs a tap operation on the return button 224, the recipe setting screen can be closed, and a return can be made to the alteration screen.

Also, in a state where a recipe that is not currently set is displayed, when a tap operation is performed on the recipe setting button 223, it is possible to set the currently displayed recipe as a recipe for the current placement target area. If the currently set recipe is displayed, the display form of the recipe setting button 223 is changed. Specifically, the text content of the recipe setting button 223 is changed to a text "currently set". Furthermore, control is performed such that the recipe setting button 223 is grayed out and, while the currently set recipe is displayed, a tap operation is not accepted.

Figure 13:
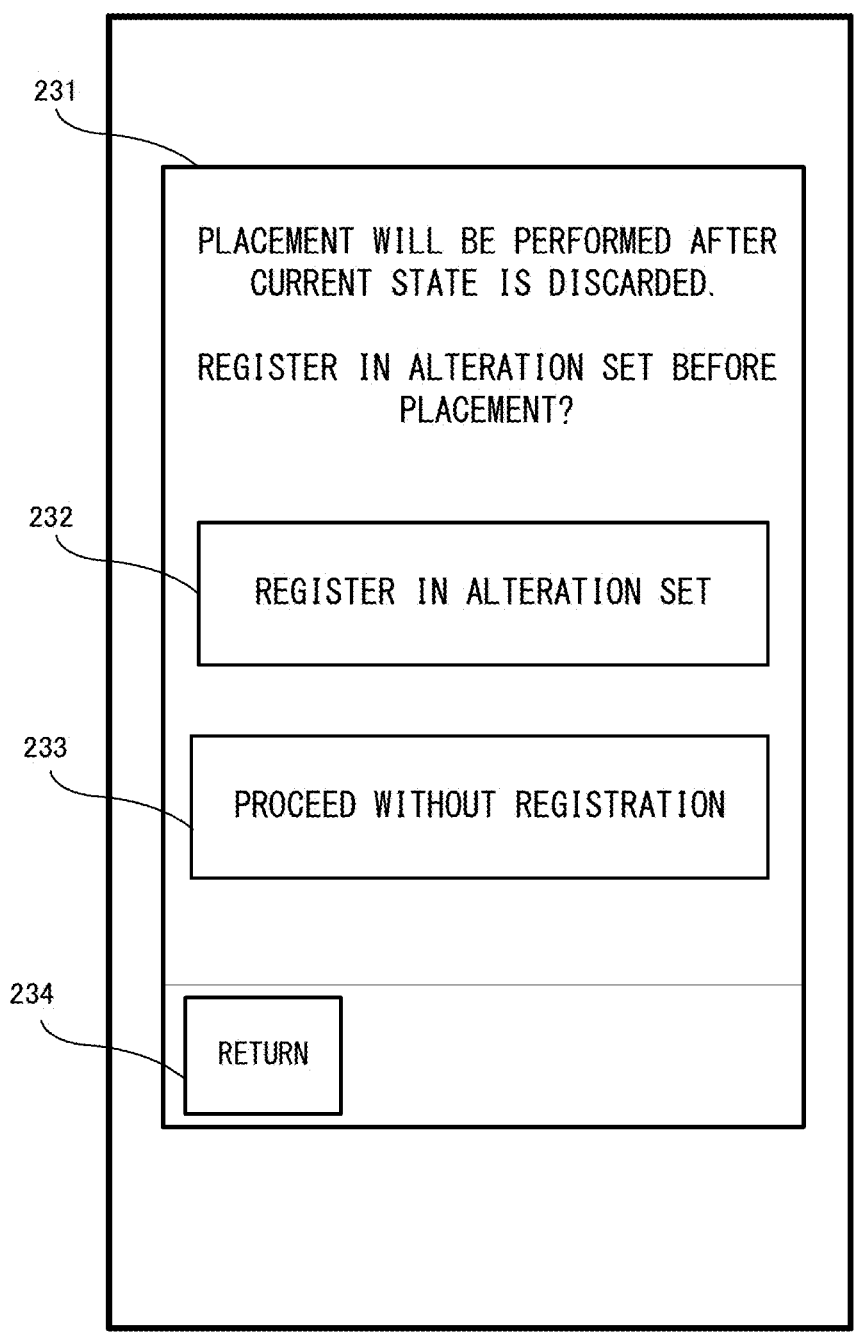
FIG. 13 illustrates a non-limiting screen example of the game of the exemplary embodiment.

Next, a screen example and an operation example in the case where a tap operation is performed on the recipe setting button 223 in a state where a recipe that is not currently set is displayed, will be described. In this case, first, a registration confirmation dialog 231 is displayed as shown in FIG. 13. This registration confirmation dialog 231 is for inquiring whether to register the current placement layout in the above "alteration set". In FIG. 13, the registration confirmation dialog 231 includes a text inquiring whether or not to register in the alteration set, a "register" button 232, a "do not register" button 233, and a "return" button 234. When a tap operation is performed on the "return" button 234, the registration confirmation dialog 231 is closed, and a return is made to the recipe setting screen. When a tap operation is performed on the "register" button 232, a predetermined screen (not shown) for registering the current placement layout in the alteration set is displayed. Furthermore, the current placement layout is registered in the alteration set according to an operation of the user. Accordingly, if the user does not like the placement layout based on the recipe, it is possible to quickly return to the original state by reading the registered placement layout.

Figure 14:
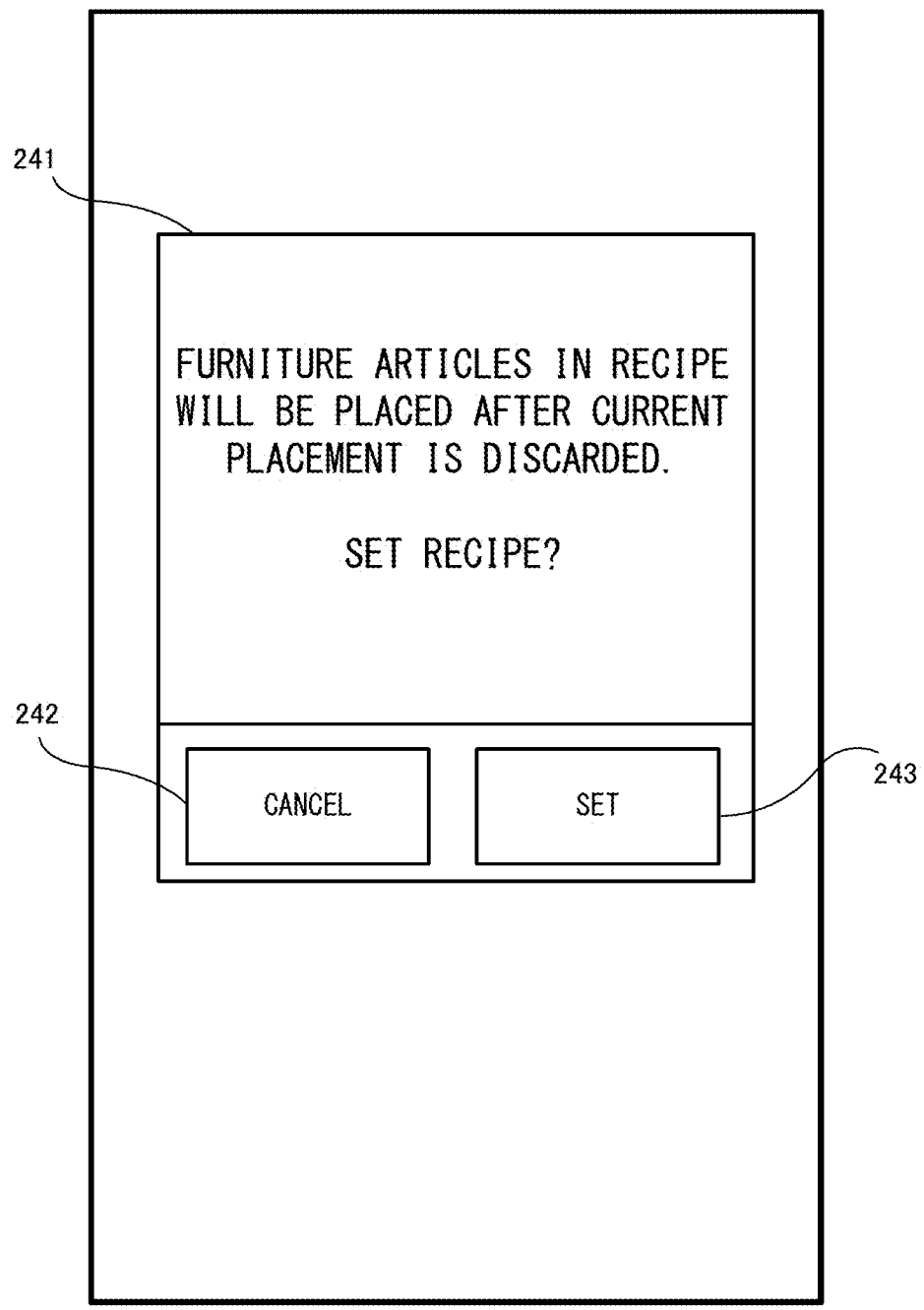
FIG. 14 illustrates a non-limiting screen example of the game of the exemplary embodiment.

When the processing related to registration is terminated on the basis of an operation on the "register" button 232, the screen further transitions to a setting confirmation screen shown in FIG. 14. In the setting confirmation screen shown in FIG. 14, a setting confirmation dialog 241 including a text requesting confirmation of discarding the current placement, a "cancel" button 242, and a "set" button 243 is displayed. This text indicates that the current placement layout is to be discarded before setting a recipe (the currently placed placement items are cleared away once). When a recipe is set, a predetermined placement item is (automatically) placed on the basis of this recipe, but if the previous placement layout is left at that time, there is a possibility that the predetermined placement item cannot be placed due to interference of the placement position thereof. From this point of view, this text notifies the user that the current placement layout is to be discarded before setting a recipe. When the user performs a tap operation on the "cancel" button 242 in response to the setting confirmation dialog 241, a return is made to the recipe setting screen shown in FIG. 9.

Figure 15:
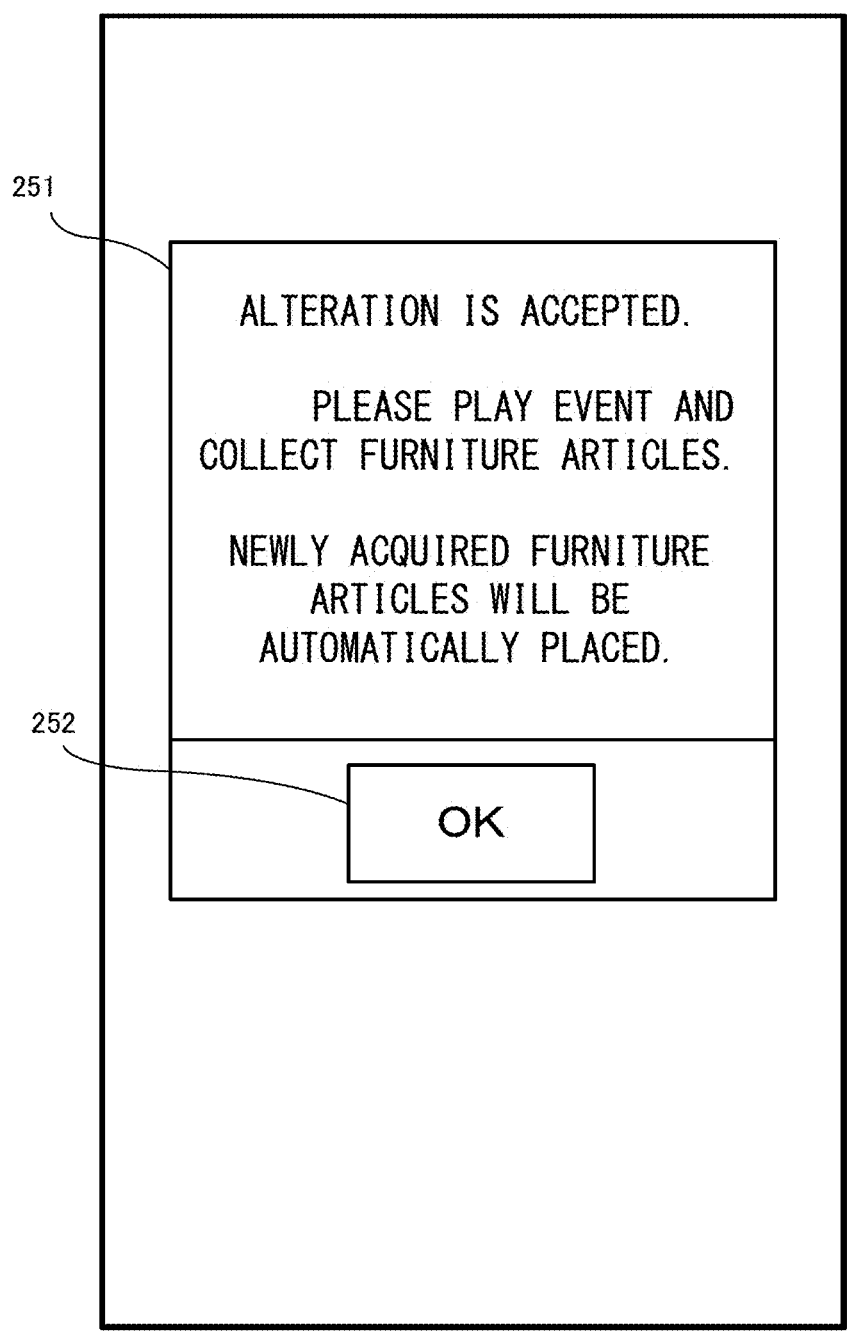
FIG. 15 illustrates a non-limiting screen example of the game of the exemplary embodiment.

On the other hand, when the user performs a tap operation on the "set" button 243, a setting completion dialog 251 is displayed as shown in FIG. 15. In the setting completion dialog 251, a predetermined text indicating that the setting of the recipe is completed, and an OK button 252 are displayed. In the following description, this set recipe is referred to as "currently set recipe". In the setting completion dialog 251, when the user performs a tap operation on the OK button 252, the screen transitions to the area screen (the campsite area in this example) shown in FIG. 4. At this time, the placement layout in this area is changed to a placement layout based on the currently set recipe that is set this time. That is, among the placement items specified by the currently set recipe, a placement item owned by the user at this time is placed as appropriate at a predetermined position on the basis of the placement position and the placement posture specified by the currently set recipe. In other words, an area screen in which the content of the set recipe is reflected is displayed.

On the other hand, in the registration confirmation dialog 231 shown in FIG. 13, when the user performs a tap operation on the "do not register" button 233, the screen transitions to the setting confirmation screen shown in FIG. 14, and the same processing is performed as described above. That is, in this case, the processing related to the registration confirmation dialog 231 described above with reference to FIG. 13 is skipped.

Figure 16:
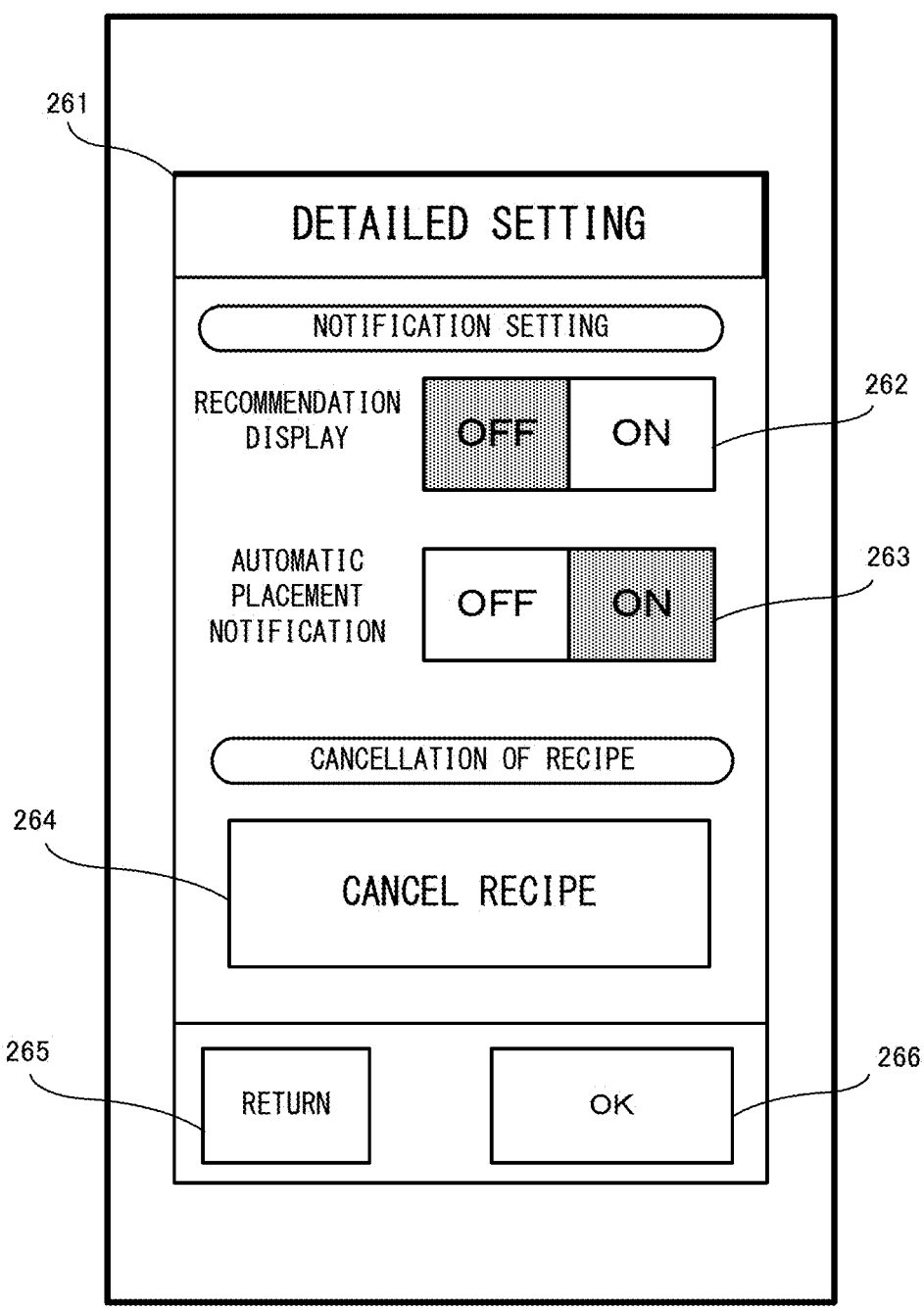
FIG. 16 illustrates a non-limiting screen example of the game of the exemplary embodiment.

Next, a screen example and an operation example in the case where a tap operation is performed on the detailed setting button 225 in the recipe setting screen shown in FIG. 9, will be described. When a tap operation is performed on the detailed setting button 225, a detailed setting dialog 261 is displayed as shown in FIG. 16. In the detailed setting dialog 261, a first toggle switch 262 and a second toggle switch 263 are displayed as items for notification setting. In addition, a cancellation button 264 for canceling the setting of the currently set recipe is also displayed below these toggle switches. Furthermore, a return button 265 and an OK button 266 are displayed below the cancellation button 264.

The first toggle switch 262 is a switch for setting whether or not to perform notification of a recommended recipe as described above with reference to FIG. 8. If the first toggle switch 262 is set to be ON, notification of a recommended recipe using the recipe-related notification 216 is performed. The second toggle switch 263 is a switch for setting whether or not to perform notification by the balloon type notification 206 in the area screen when a placement item is automatically placed. If the second toggle switch 263 is set to be ON, when automatic placement is performed, it is notified using the balloon type notification 206 that the automatic placement has been performed.

Also, in a state where a predetermined recipe is currently set, when a tap operation is performed on the cancellation button 264, "no recipe is set" or the like is displayed as a text in the cancellation button 264, and the cancellation button 264 is changed to a state where the cancellation button 264 does not accept a tap operation. At this time, the content of the change has not been finalized yet, and when the OK button 266 described later is tapped, the change can be finalized, the recipe setting can be canceled, and a state where no recipe is set can be obtained. In a state where no recipe is set, the above "no recipe is set" is initially displayed in the cancellation button 264.

The return button 265 is a button for returning to the recipe setting screen with the state before change being kept without reflecting changes of the first toggle switch 262, the second toggle switch 263, and the cancellation button 264. The OK button 266 is a button for returning to the recipe setting screen with changes made to the first toggle switch 262, the second toggle switch 263, and the cancellation button 264 being reflected. At this time, a message "setting has been changed" or the like may be displayed. In another exemplary embodiment, as soon as the first toggle switch 262, the second toggle switch 263, or the cancellation button 264 is operated, the change thereof may be reflected immediately. In this case, the OK button 266 serves as a button for simply closing the detailed setting dialog 261.

Figure 17:
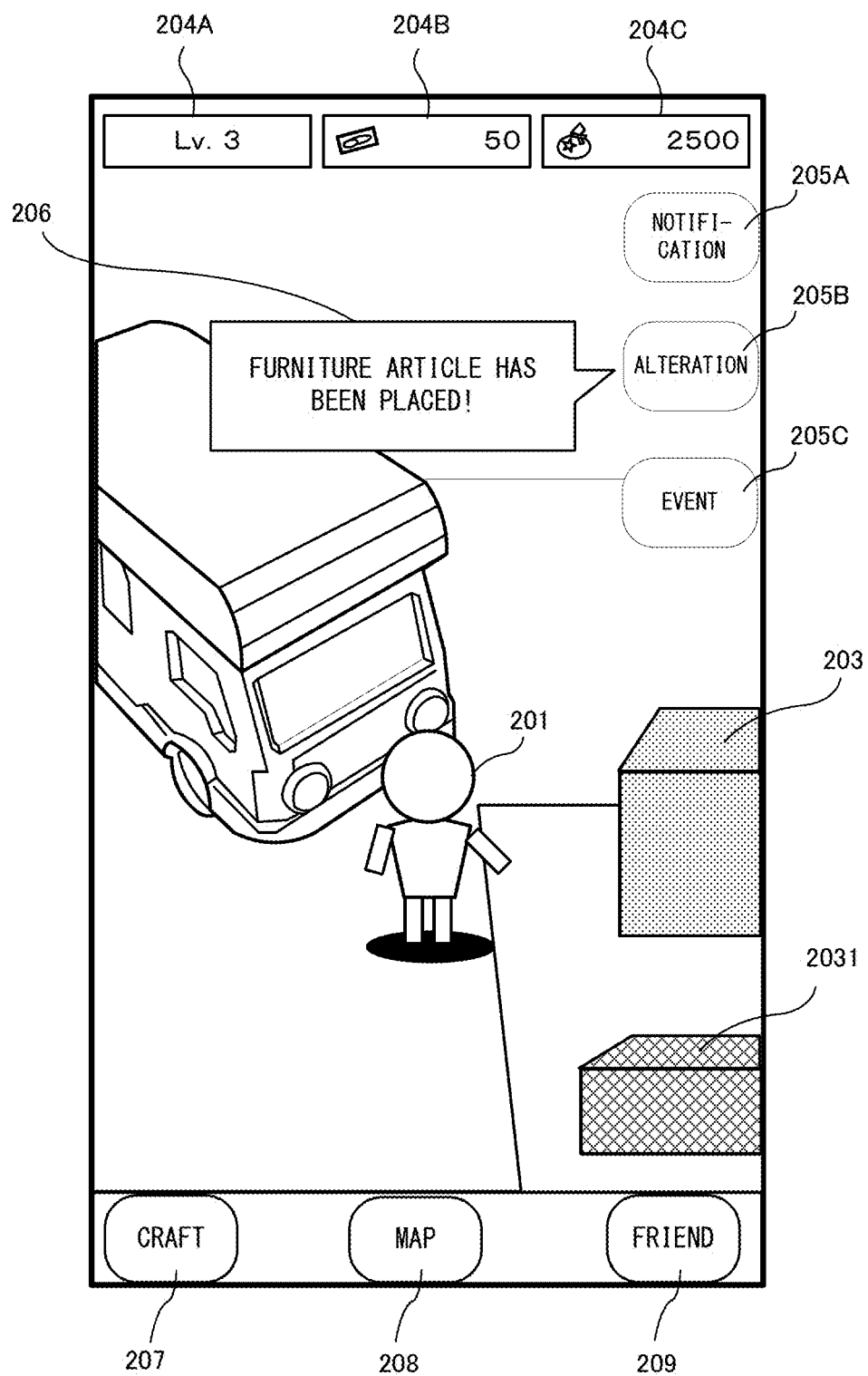
FIG. 17 illustrates a non-limiting screen example of the game of the exemplary embodiment.

As described above, in the exemplary embodiment, by the user performing a predetermined operation using the recipe setting screen as described above, the predetermined recipe can be set for each placement target area. Then, in a state where a recipe is currently set, when a placement item that is not owned at the time at which the recipe is set, among the placement items specified by the currently set recipe, is acquired later, this placement item is placed at a predetermined position on the basis of the recipe without the user performing any special placement operation. FIG. 17 shows a screen example in the case where a predetermined placement item is automatically placed in the campsite area. FIG. 17 illustrates an example in which a placement item 2031 which is acquired after a predetermined recipe is set is automatically placed, and a notification indicating that the automatic placement has been performed is displayed in the balloon type notification 206. The convenience of the user can be enhanced by such automatic placement based on the recipe.

Details of Game Processing of Exemplary Embodiment

Next, the game processing of the exemplary embodiment will be described in more detail with reference to FIG. 18 to FIG. 34.

Data to be Used

Figure 18:
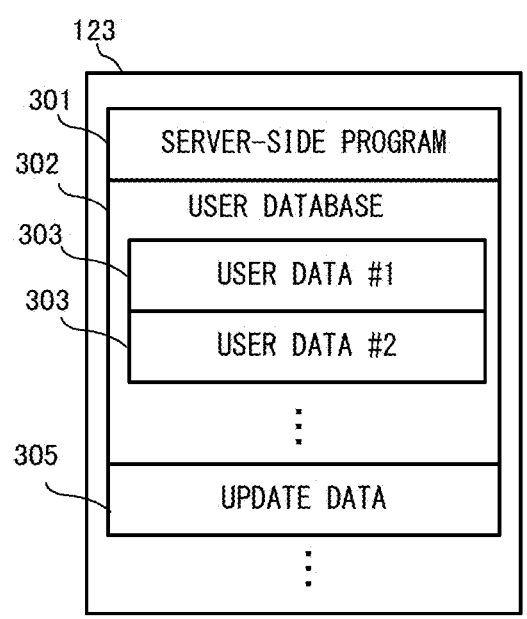
FIG. 18 illustrates a non-limiting example of programs and data stored in a memory 123 of the server 101.

First, various kinds of data to be used in the game processing will be described. FIG. 18 illustrates an example of programs and data stored in the memory 123 of the server 101. In the memory 123, a server-side program 301, a user database 302, update data 305, etc., are stored.

The server-side program 301 is a program for causing the server 101 to execute various functions that the server side is responsible for in the game processing according to the exemplary embodiment.

The user database 302 is a database that stores information about each user of the game according to the exemplary embodiment, and includes a plurality of user data sets 303. As for each user data set 303, when a process of logging in to the game is performed in the information processing apparatus 102, the user data set 303 corresponding to a login account is transmitted from the server 101 to the information processing apparatus 102.

Figures 19, 20:
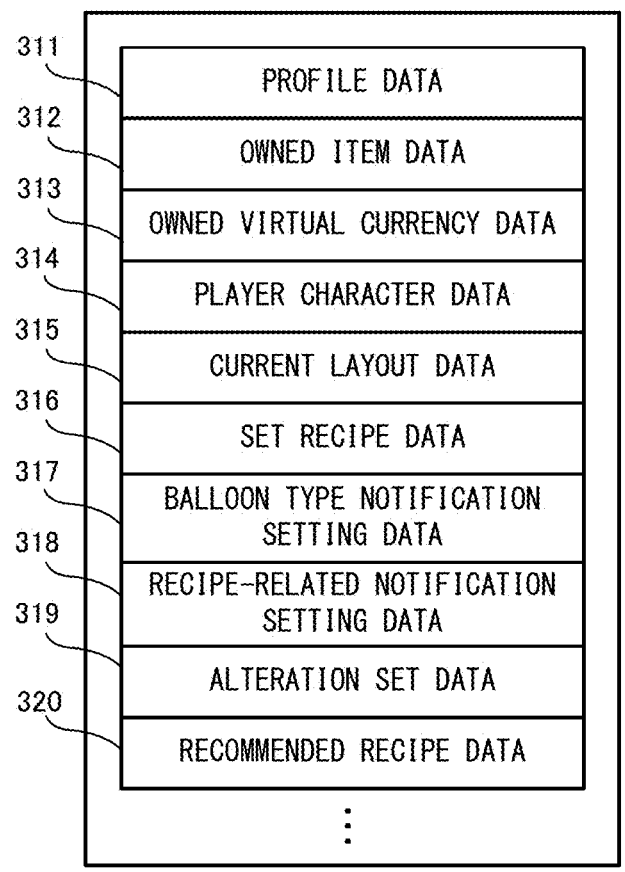
FIG. 19 illustrates a non-limiting example of the data structure of a user data set 303.
FIG. 20 illustrates a non-limiting example of the data structure of current layout data 315.

FIG. 19 illustrates an example of the data structure of the user data set 303. The user data set 303 includes profile data 311, owned item data 312, owned virtual currency data 313, player character data 314, current layout data 315, set recipe data 316, balloon type notification setting data 317, recipe-related notification setting data 318, alteration set data 319, recommended recipe data 320, etc.

The profile data 311 includes information about the user. The profile data 311 includes, for example, a user ID which is information for uniquely identifying a predetermined user, account information required for a log-in process, a user name indicating a user name in the game, a user level as described above, etc.

The owned item data 312 is data indicating the placement items owned by the user related to the user data set 303 and the number of these placement items. The owned item data 312 includes, for example, item IDs 421 in an item master 402 described later and the number of these item IDs 421, etc.

The owned virtual currency data 313 is data indicating the in-game virtual currency owned by the user related to the user data set 303.

The player character data 314 is data about the player character 201 to be displayed in a game screen. The player character data 314 includes, for example, information indicating the appearance of the player character 201, information indicating the current position of the player character 201 in the virtual space, etc.

The current layout data 315 is data indicating the content of the current placement layout of each of the above placement target areas. In the exemplary embodiment, the current layout data 315 includes the current placement layout of each of the three areas, i.e., the campsite area, the cottage 1st floor area, and the cottage 2nd floor area. FIG. 20 illustrates an example of the data structure of the current layout data 315. As shown in FIG. 20, the current layout data 315 is data in a table format in which an area name 331 which identifies a placement target area and a placement layout content 332 which is information indicating a specific placement layout are associated with each other. The placement layout content 332 includes information indicating the position, the posture, etc., of each placement item placed in the placement target area.

Figures 21, 22:
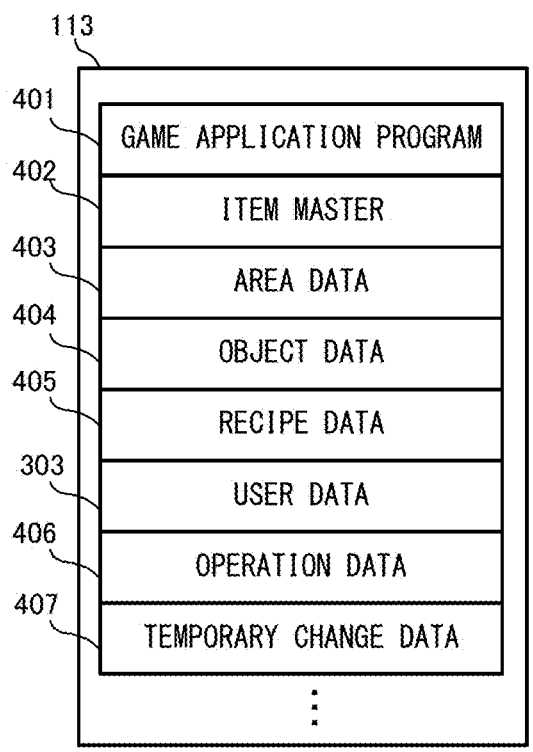
FIG. 21 illustrates a non-limiting example of the data structure of set recipe data 316.
FIG. 22 illustrates a non-limiting example of programs and data stored in a memory 113 of the information processing apparatus 102.

Referring back to FIG. 19, the set recipe data 316 is data for indicating whether or not a recipe is set for each placement target area, and for, when a recipe is set, specifying this recipe. FIG. 21 illustrates an example of the data structure of the set recipe data 316. The set recipe data 316 is data in a table format in which an area name 341 which identifies a placement target area and a set recipe ID 342 for specifying a recipe that is set in this area are associated with each other. Here, in the exemplary embodiment, as a specific example of the value of the set recipe ID 342, "000" is set when no recipe is set, and a value of "001" or more is set when a recipe is set. The value of "001" or more corresponds to a recipe ID 431 in recipe data 405 described later.

Referring back to FIG. 19, the balloon type notification setting data 317 is data to be used for control for notifying that a placement item has been automatically placed on the basis of the currently set recipe, by using the balloon type notification 206. Specifically, the balloon type notification setting data 317 includes setting information about whether or not to perform notification when a placement item is automatically placed as described above.

The recipe-related notification setting data 318 is data to be used for control for notification of a recommended recipe using the recipe-related notification 216 as shown in FIG. 6 to FIG. 8. Specifically, the recipe-related notification setting data 318 includes setting information about whether or not to perform notification of a recommended recipe.

The alteration set data 319 is data of one or more placement layouts stored as the above-described "alteration set".

The recommended recipe data 320 is data for indicating a recipe already displayed as a recommended recipe in the recipe-related notification 216. Specifically, a recipe ID 431 corresponding to a recipe that has already been recommended is registered in the recommended recipe data 320.

In addition, although not shown, the user data set 303 also includes data, of the user, indicating the progress status of a quest or an event, etc.

Referring back to FIG. 18, the update data 305 is data for updating a part of data stored in the information processing apparatus 102 described later. Here, in the exemplary embodiment, when a new recipe is created, this recipe is included in the update data 305, and the update data 305 is distributed to each information processing apparatus 102. In addition, for example, when a distribution item is added, additional data is distributed in the form of the update data 305.

Next, the data stored in the information processing apparatus 102 will be described. FIG. 22 illustrates an example of programs and data stored in the memory 113 of the information processing apparatus 102. In the memory 113, a game application program 401, the item master 402, area data 403, object data 404, the recipe data 405, the user data set 303, operation data 406, temporary change data 407, etc., are stored.

The game application program 401 is a program for causing the information processing apparatus 102 to execute various functions that the information processing apparatus 102 is responsible for in the game processing according to the exemplary embodiment.

Figure 23:
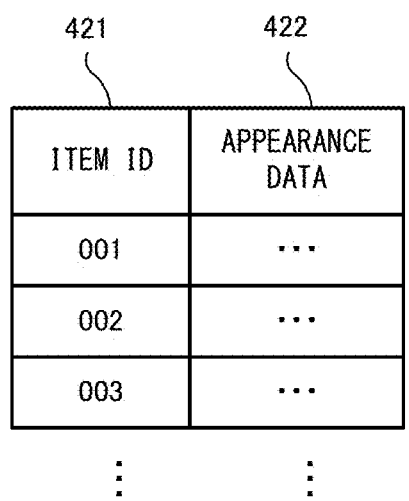
FIG. 23 illustrates a non-limiting example of the data structure of an item master 402.

The item master 402 is a database about placement items that appear in the game. FIG. 23 illustrates an example of the data structure of the item master 402. The item master 402 is data in a table format including at least items such as the item ID 421 and appearance data 422. The item ID 421 is an ID for uniquely identifying and specifying a placement item. The appearance data 422 is image data indicating the appearance of the placement item. In addition, although not shown, information indicating the genre of each placement item, information indicating material items required for creating each placement item, etc., are also defined in the item master 402.

Referring back to FIG. 22, the area data 403 is data that defines each of the above areas in the exemplary embodiment. The area data 403 includes the name of each area and various kinds of data for forming each area such as data of the appearance and terrain of each area.

The object data 404 is data that defines images, shapes, and the like of various objects (NPCs, etc.) that appear in the game world.

Figure 24:
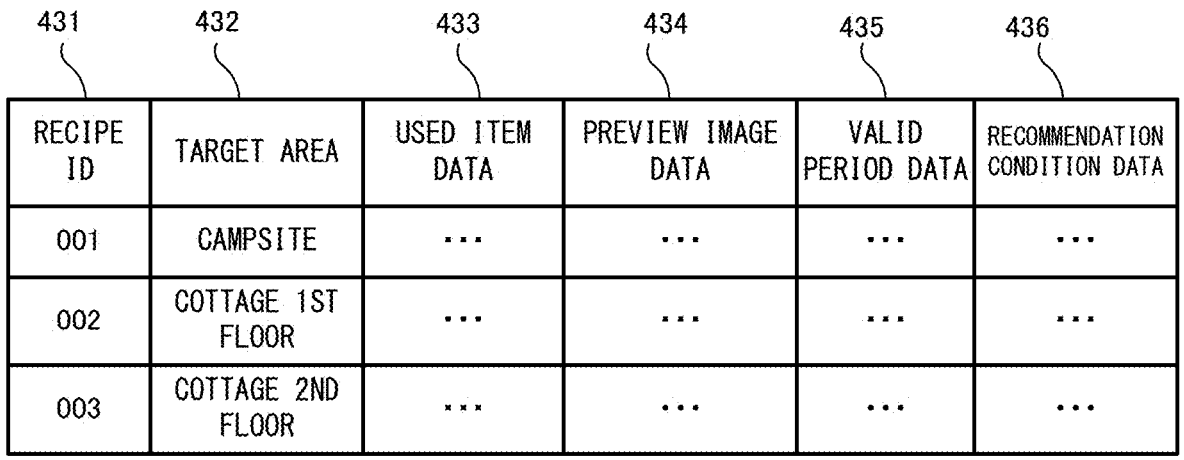
FIG. 24 illustrates a non-limiting example of the data structure of recipe data 405.

The recipe data 405 is data that defines the content of the recipe. FIG. 24 illustrates an example of the data structure of the recipe data 405. The recipe data 405 is a database having items such as the recipe ID 431, a target area 432, used item data 433, preview image data 434, valid period data 435, and recommendation condition data 436.

The recipe ID 431 is an ID for uniquely identifying each recipe. The target area 432 is data indicating a placement target area to which the recipe is applied. In the exemplary embodiment, any of the campsite area, the cottage 1st floor area, and the cottage 2nd floor area is designated. The used item data 433 is data about each placement item associated with the recipe. Specifically, the used item data 433 includes the item ID 421 of each placement item used in the recipe and information indicating the number of placement items (the case where a plurality of placement items that are the same are used) and the placement position, the placement posture, etc., of the placement items. The preview image data 434 is data of images to be displayed in the above-described preview images 221, etc. The valid period data 435 is data that defines the valid period of the recipe. For example, the start date and time and the end date and time of the validity period are defined for each recipe. The recommendation condition data 436 is data that defines a condition for the recipe to be notified as the recommended recipe. As described above, three kinds of conditions are defined in the exemplary embodiment, and one of these conditions is set as the recommendation condition data 436 for each recipe.

The contents of the item master 402, the area data 403, the object data 404, and the recipe data 405 are added or updated as appropriate on the basis of the update data 305 received from the server 101.

Referring back to FIG. 22, as for the user data set 303, when a process of logging in to the game is performed, the user data set 303 corresponding to a login account is acquired from the server 101 and stored (the data structure thereof has been described above, and thus the description thereof is omitted). In addition, in the game processing in the information processing apparatus 102, the content of the user data set 303 is updated as appropriate, and transmitted to the server 101 at a predetermined timing. For example, at a predetermined timing such as a timing when screen transition in the game occurs and a timing when an increase or decrease in the number of items occurs, the user data set 303 in which the result of the game processing in the information processing apparatus 102 is reflected (in other words, which has been saved) is transmitted to the server 101. Then, on the server 101 side, the user data set 303 is updated on the basis of the transmitted data.

The operation data 406 is data indicating the contents of various operations performed on the operation section 115. In the exemplary embodiment, the operation data 406 includes the presence/absence of an input to the touch panel as the operation section 115, data indicating a touch coordinate or the like of the input, data indicating pressed states of various buttons that are not shown, and the like. The contents of the operation data 406 are updated in predetermined cycles on the basis of a signal from the operation section 115.

The temporary change data 407 is data of a placement layout in a state of being changed (before the change is finalized) which is temporarily stored when the user manually changes the placement in the alteration screen.

In addition, although not shown, various kinds of data required for the game processing such as data about events and quests in the game and audio data are also stored in the memory 113.

Details of Game Processing Example

Next, the game processing according to the exemplary embodiment will be described in detail with reference to flowcharts. Here, processing related to placement of the placement item as described above will be mainly described, and the description of other game processing is omitted.

First, processing in the server 101 will be briefly described. Although not shown, in the server 101, a log-in process, a process of transmitting the update data 305, a process of transmitting or receiving the user data set 303, etc., are performed as appropriate in response to various requests from the information processing apparatus 102 such as a log-in process request based on a game start operation of the user on the information processing apparatus 102.

Figure 25:
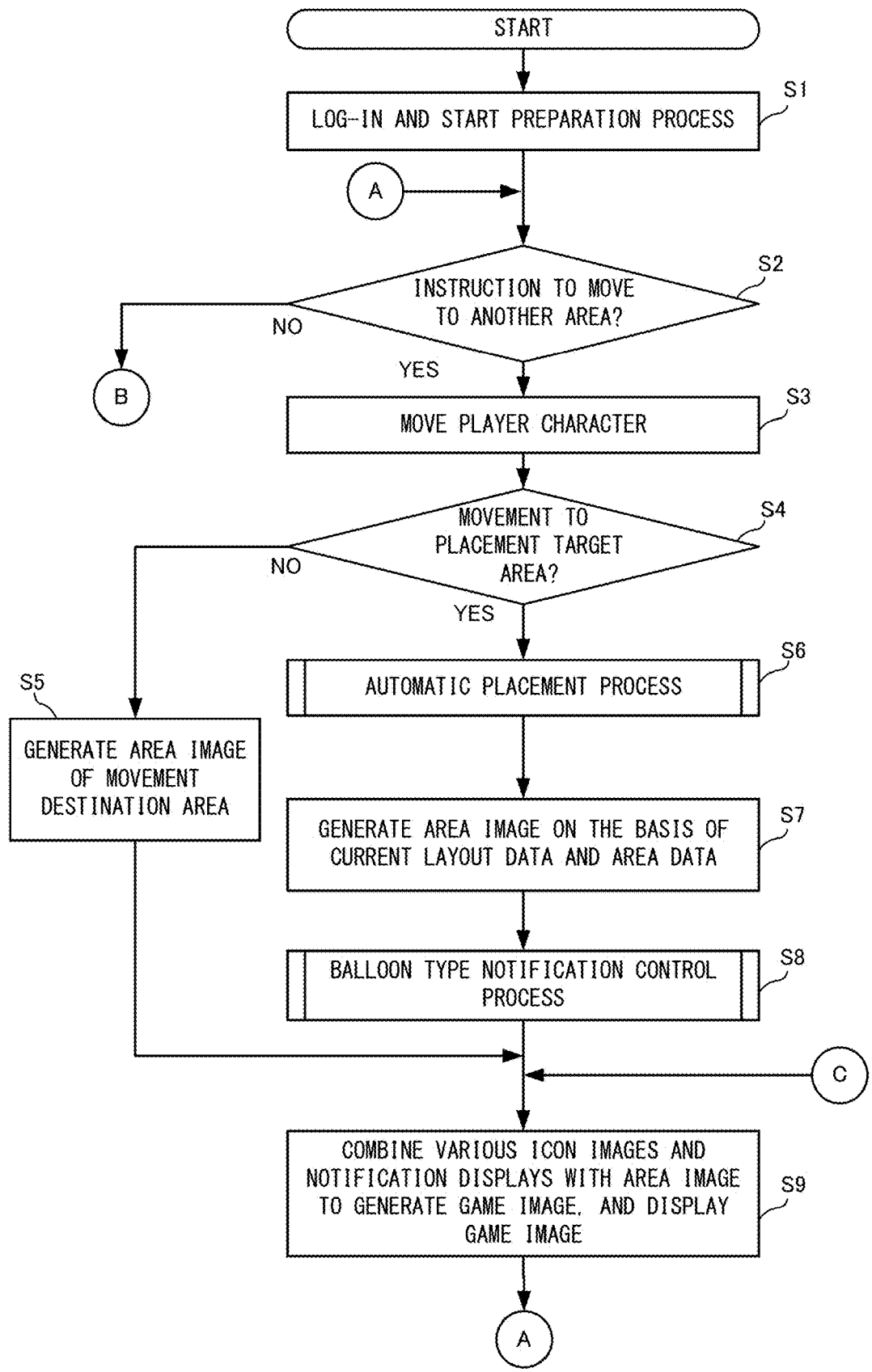
FIG. 25 is a flowchart showing the details of game processing according to the exemplary embodiment.
Figure 26:
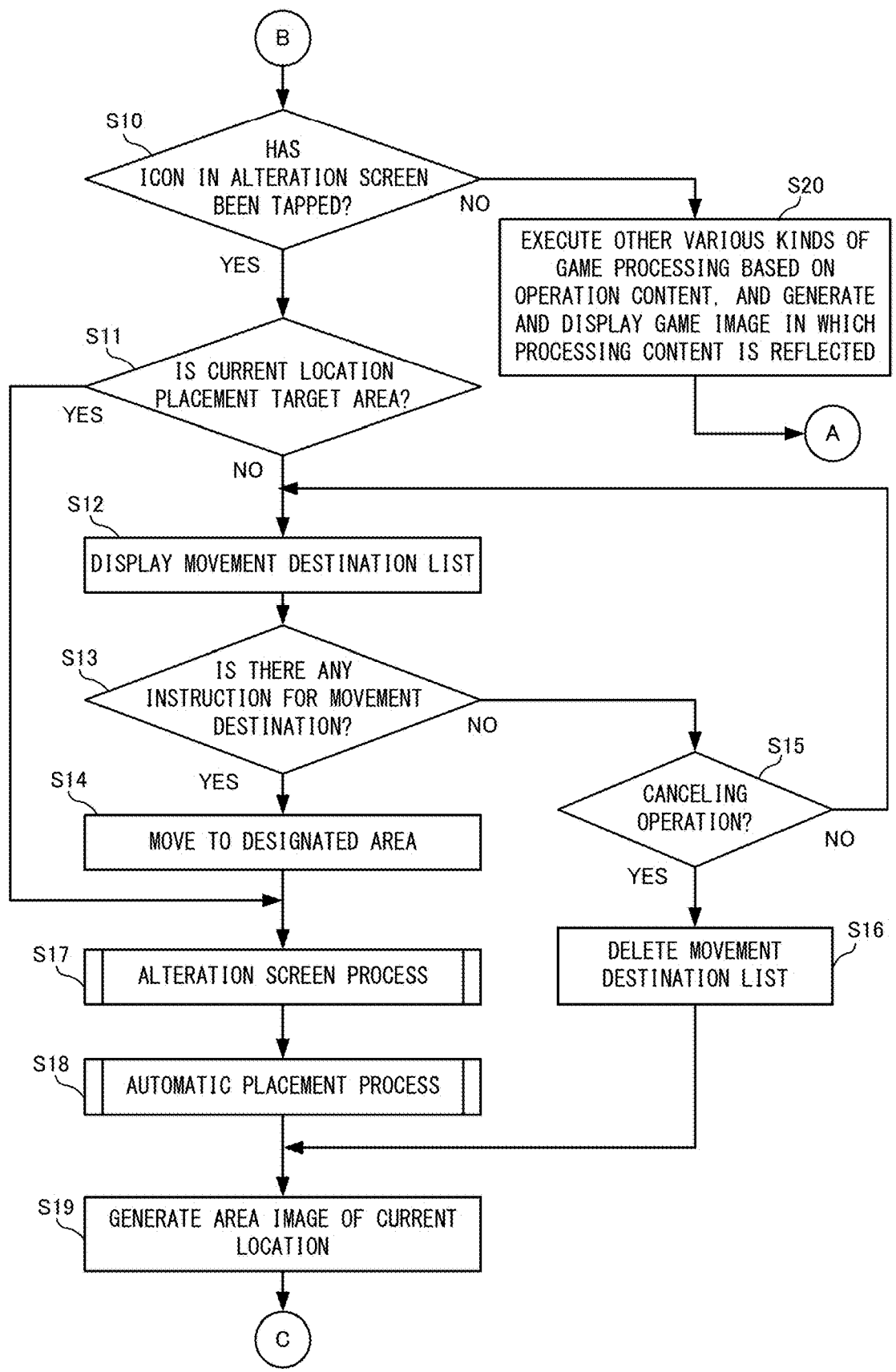
FIG. 26 is a flowchart showing the details of the game processing according to the exemplary embodiment.

Next, processing in the information processing apparatus 102 will be described in detail. FIG. 25 and FIG. 26 are each a flowchart showing the details of the game processing in the information processing apparatus 102. The processing is started, for example, when the user performs an operation for starting the game processing according to the exemplary embodiment.

In FIG. 25, first, in step S1, the processor 111 executes a log-in process and a preparation process for starting the game. Specifically, the processor 111 executes a log-in process related to the game with the server 101. If the log-in is successful, the processor 111 receives the user data set 303 transmitted from the server 101. In addition, the processor 111 also receives the update data 305 from the server 101 as necessary, and updates the item master 402, the recipe data 405, etc., as appropriate. In particular, when a new recipe as described above is created on the server 101 side, the new recipe is distributed from the server 101 to the information processing apparatus 102 by such a process. In addition, as the preparation process for starting the game, the processor 111 initializes various kinds of data to be used in the game processing, such as the temporary change data 407. Furthermore, the processor 111 places the player character 201 at a predetermined position within the campsite area in an initial screen after the game starts. Moreover, the processor 111 places placement items within the campsite area on the basis of the current layout data 315 corresponding to the campsite area. Then, the processor 111 takes an image of the campsite area with a virtual camera. Furthermore, the processor 111 combines images such as the icons 205A to 205C with the taken image to generate an area screen as shown in FIG. 4, and displays the generated area screen on the display section 116. Thereafter, the processor 111 waits for an operation from the user.

Processing Related to Area Screen

Next, in step S2, the processor 111 acquires the operation data 406, and determines whether the operation content indicated by the operation data 406 is an instruction to move to another area. As a result of the determination, if the operation content is an instruction to move to another area (YES in step S2), in step S3, the processor 111 moves the player character 201 to the other area. Next, in step S4, the processor 111 determines whether this movement is movement to the placement target area. As a result of the determination, if this movement is not movement to the placement target area (NO in step S4), in step S5, the processor 111 generates an area image related to the non-placement target area which is the movement destination at this time, on the basis of the area data 403. This image is an image taken at a position and an angle of the virtual camera such that the player character 201 is included in the field of view of the virtual camera (substantially in the center thereof). Thereafter, the processor 111 advances the processing to step S9 described later.

Automatic Placement Process

Figure 27:
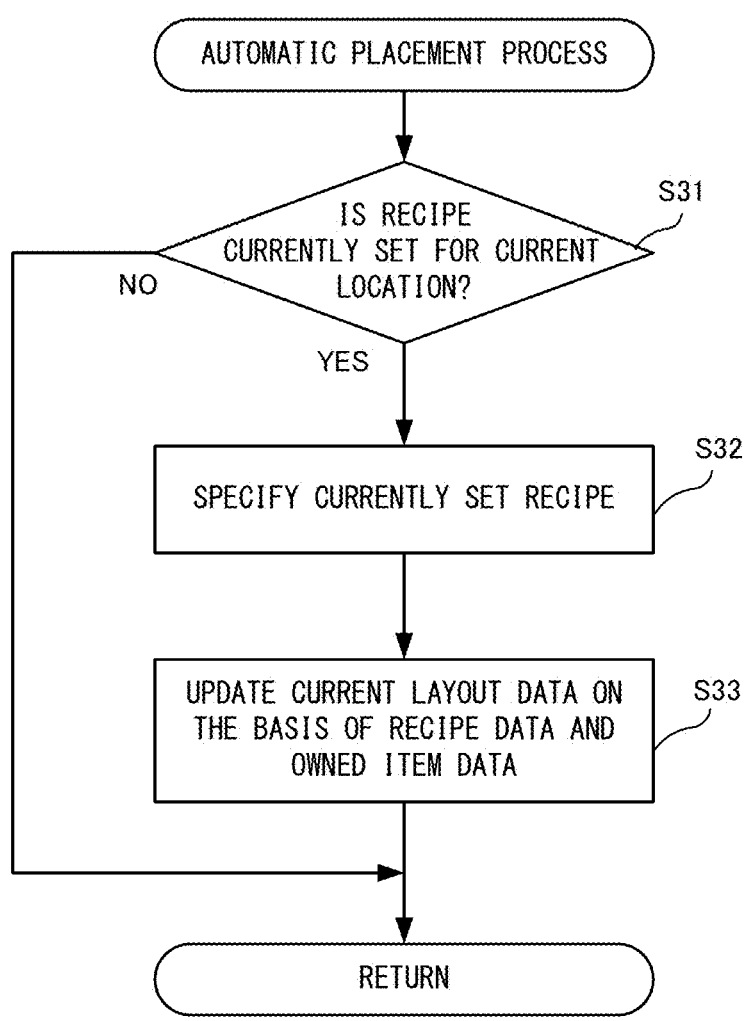
FIG. 27 is a flowchart showing the details of an automatic placement process.

On the other hand, as a result of the determination in step S4, if this movement is movement to the placement target area (YES in step S4), in step S6, the processor 111 executes an automatic placement process. This process is a process for performing automatic placement as described above, on the basis of the currently set recipe and the items owned by the user. FIG. 27 is a flowchart showing the details of the automatic placement process. In FIG. 27, first, in step S31, the processor 111 refers to the set recipe data 316 and determines whether a predetermined recipe has been set for the placement target area in which the player character 201 is currently located. That is, the processor 111 determines whether the automatic placement mode is ON or OFF. Specifically, if the value of the set recipe ID 342 is "000", the processor 111 determines that no recipe is set (the automatic placement mode is OFF). On the other hand, if a value other than "000" has been set, the processor 111 determines that a recipe corresponding to this value (that is, the recipe ID 431) has been set (the automatic placement mode is ON). As a result of the determination, if a predetermined recipe has been set (YES in step S31), in step S32, the processor 111 specifies the currently set recipe on the basis of the set recipe ID 342 and the recipe data 405. Next, in step S33, the processor 111 updates the content of the current layout data 315 related to the placement target area in which the player character 201 is currently located, on the basis of the specified recipe and the owned item data 312. Specifically, the processor 111 determines the difference between the placement items currently used in the current layout data 315 and the placement items specified by the recipe. That is, the processor 111 determines any placement item that has not been placed at that time. Next, the processor 111 determines whether any placement item related to this difference is included in the owned item data 312. If such a placement item is included in the owned item data 312, it is considered that the placement item is not owned at the time at which the recipe is set, and is a placement item acquired later. Therefore, the processor 111 places the placement item related to this difference, in a predetermined posture at a predetermined position based on the recipe data 405. Then, the processor 111 updates the placement layout after this placement, as the current layout data 315. Thereafter, the automatic placement process ends. In addition, if there is no difference between the placement items currently used in the current layout data 315 and the placement items specified by the recipe, update of the current layout data 315 is not performed, and the automatic placement process ends.

As for the process in step S33, in the exemplary embodiment, the method for determining the difference between the owned item data 312 at that time and the placed placement items is used, but the process method is not limited thereto. In another exemplary embodiment, for example, the following method may be used for placement. First, the processor 111 refers to the owned item data 312 and extracts any placement item specified by the recipe, from the placement items owned by the user. Next, the processor 111 places the extracted placement item at a predetermined position in a predetermined posture on the basis of the definition of the recipe. That is, while the recipe is currently set, a process in which the placement items that are specified by the recipe and that are the placement items owned by the user at that time are placed again each time the screen transitions to the placement target area, may be performed.

On the other hand, as a result of the determination in step S31, if no recipe is set for the placement target area in which the player character 201 is currently located (NO in step S31), the processor 111 does not perform the processes in steps S32 and S33 and ends the automatic placement process. That is, the processor 111 does not change the content of the current layout data 315, and ends the automatic placement process while maintaining the current content of the current layout data 315.

Referring back to FIG. 25, in step S7 next to the process in step S6, the processor 111 generates an area image related to the placement target area in which the player character 201 is currently located. Specifically, the processor 111 creates a placement target area on the basis of the current layout data 315 and the area data 403, and places the player character 201 at a predetermined position. Then, the processor 111 generates an area image by taking an image of the placement target area with the virtual camera.

Figure 28:
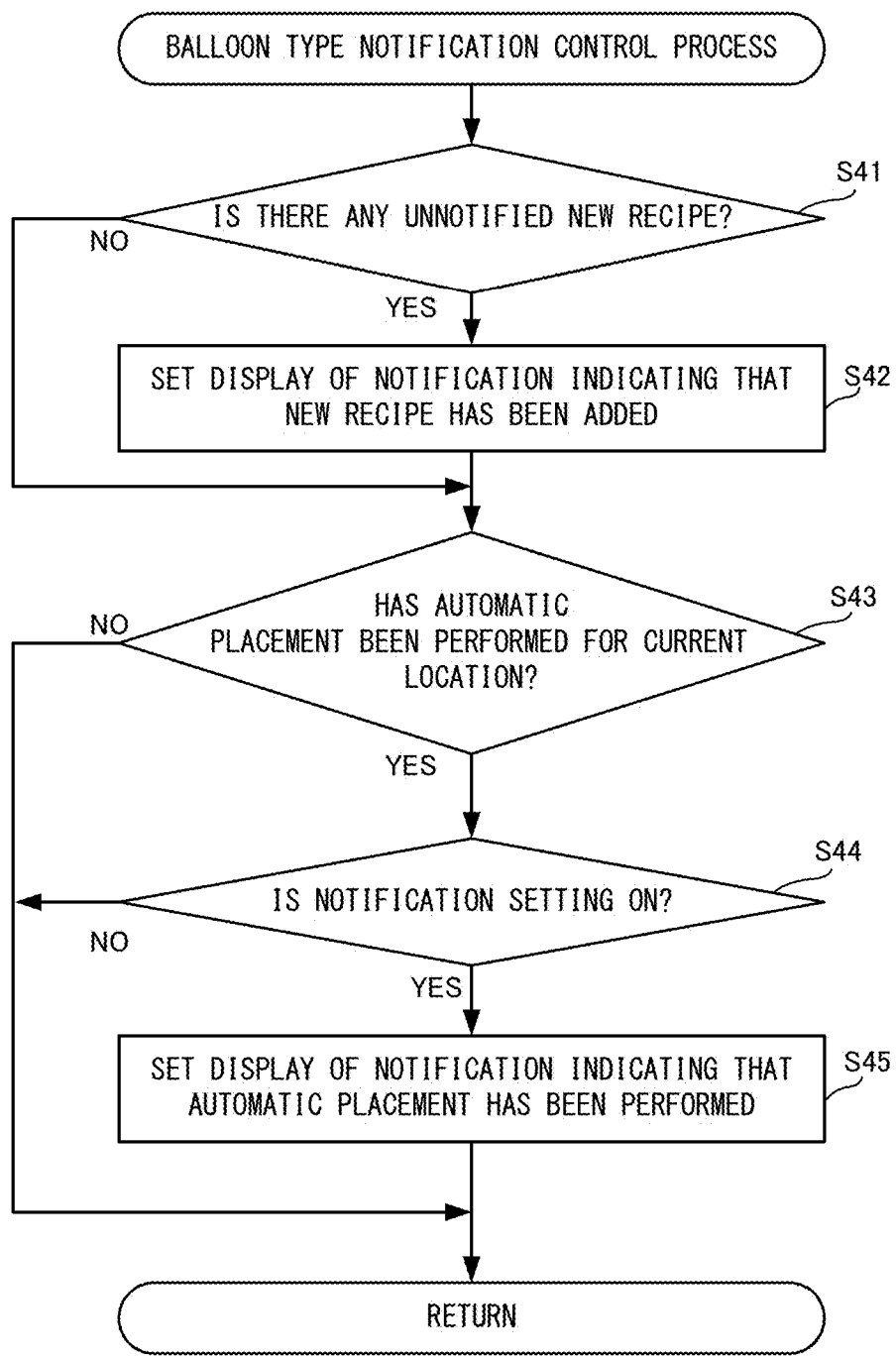
FIG. 28 is a flowchart showing the details of a first notification control process.

Next, in step S8, the processor 111 executes a balloon type notification control process. This process is a process for setting the display content of the balloon type notification 206. FIG. 28 is a flowchart showing the details of the balloon type notification control process. First, in step S41, the processor 111 determines whether there is any unnotified new recipe. The method for determining the presence or absence of a new recipe may be any method, but for example, this determination may be performed on the basis of whether update of the recipe data 405 based on the update data 305 from the server 101 has been performed at the time of the log-in process. Then, if the recipe data 405 has been updated, the processor 111 may determine that there is an unnotified new recipe. As a result of the determination, if there is any unnotified new recipe (YES in step S41), in step S42, the processor 111 performs setting for displaying a notification indicating that the new recipe has been added, in the balloon type notification 206. In the exemplary embodiment, the processor 111 performs display setting such that a predetermined text indicating that the new recipe has been added and the preview image included in the recipe data 405 are displayed as the balloon type notification 206 as shown in FIG. 4. In addition, the processor 111 also performs setting in which a display time of the notification is set to 2 seconds (the notification is automatically deleted after 2 seconds elapse). Furthermore, the processor 111 also performs a predetermined setting process such that this recipe is treated as notified after the end of the display of the notification.

On the other hand, as a result of the determination in step S41, if there is no unnotified new recipe (NO in step S41), the process in step S42 is skipped, and the processor 111 proceeds to the next process step.

Next, in step S43, the processor 111 determines whether automatic placement has been performed for the area in which the player character 201 is currently located. That is, the processor 111 determines whether, when the currently displayed area is a placement target area and transition to the area screen thereof is performed, automatic placement of a placement item acquired later as described above has been performed. The method of this determination may be any method, but for example, when automatic placement of a placement item acquired later is performed in the automatic placement process, the processor 111 may set a flag for indicating that automatic placement has been performed, to be ON. Then, the processor 111 may determine whether or not automatic placement has occurred, on the basis of the flag, and may perform a process of setting the flag to be OFF after notification.

As a result of the determination, if automatic placement has not been performed (NO in step S43), the processor 111 ends the balloon type notification control process. On the other hand, if automatic placement has been performed (YES in step S43), in step S44, the processor 111 determines whether the notification setting for automatic placement has been set to be ON, on the basis of the balloon type notification setting data 317. As a result of the determination, if the notification setting is not ON (NO in step S44), the processor 111 ends the balloon type notification control process. On the other hand, if the notification setting is ON (YES in step S44), in step S45, the processor 111 performs display setting such that a notification indicating that automatic placement of the placement item has been performed is displayed as the balloon type notification 206. The display time of the notification is also assumed to be 2 seconds similar to the above. In addition, when also performing display of a notification of the new recipe, the display of the notification of the new recipe is prioritized. After the display of the notification of the new recipe ends, a notification related to the automatic placement is displayed. Thereafter, the processor 111 ends the balloon type notification control process.

Referring back to FIG. 25, next, in step S9, the processor 111 generates and displays an area screen. Specifically, the processor 111 combines the generated area image, images such as the various icons 205 and the status displays 204 in which the display setting by the balloon type notification control process is reflected, etc., to generate, for example, an area screen as shown in FIG. 4, and displays the generated area screen. Thereafter, the processor 111 returns to step S2 and repeats the process.

Next, processing in the case where, as result of the determination in step S2, the operation content is not an instruction to move to another area, will be described. In this case (NO in step S2), in step S10 in FIG. 26, the processor 111 determines whether the operation content is a tap operation on the icon 205B (icon for transitioning to the alteration screen). As a result of the determination, if the operation content is a tap operation on the icon 205B (YES in step S10), next, in step S11, the processor 111 determines whether the area in which the player character 201 is currently located is a placement target area. As a result of the determination, if the area in which the player character 201 is currently located is not a placement target area (NO in step S11), a process for promoting the user to move to any one of the placement target areas is performed. Specifically, in step S12, the processor 111 displays a list dialog (not shown) of the placement target areas and waits for an operation of the user. Next, in step S13, the processor 111 determines whether an instruction operation for designating a movement destination has been performed. As a result of the determination, if such a movement instruction operation has been performed (YES in step S13), in step S14, the processor 111 moves the player character 201 to the designated placement target area, and generates and displays an area screen of the placement target area. Thereafter, the processor 111 advances the processing to step S17 described later.

On the other hand, as a result of the determination in step S13, if an instruction operation for designating a movement destination has not been performed (NO in step S13), in step S15, the processor 111 determines whether an operation for canceling the list dialog has been performed. As a result, if such a canceling operation has not been performed (NO in step S15), the processor 111 returns to step S12 and repeats the process. On the other hand, if such a canceling operation has been performed (YES in step S15), in step S16, the processor 111 deletes the list dialog. Thereafter, the processor 111 advances the processing to step S19 described later.

On the other hand, as a result of the determination in step S11, if the area in which the player character 201 is currently located is a placement target area (YES in step S11), the processes in steps S12 to S16 are skipped, and the processor 111 advances the processing to step S17.

Processing Related to Alteration Screen

Figure 29:
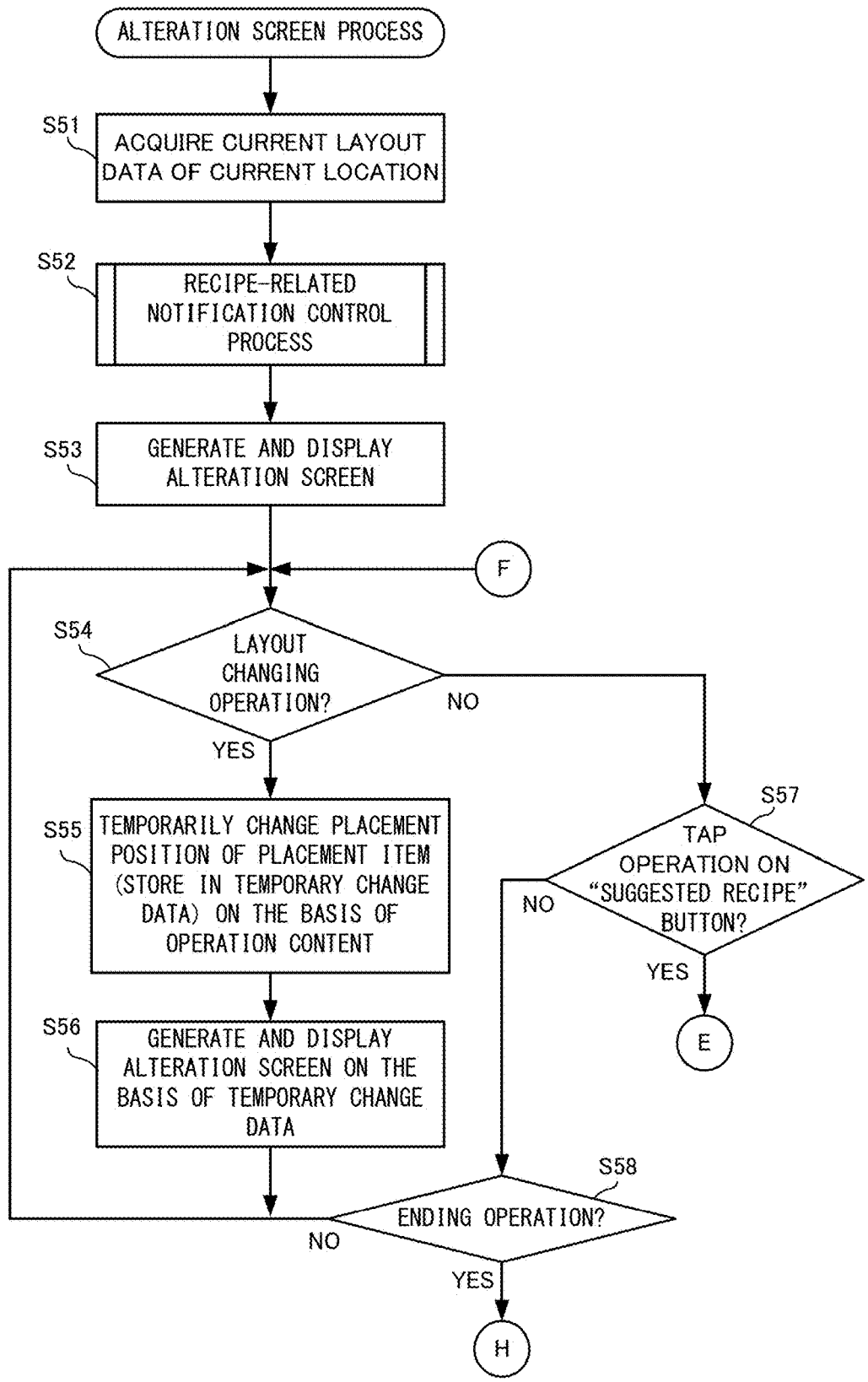
FIG. 29 is a flowchart showing the details of an alteration screen process.
Figure 30:
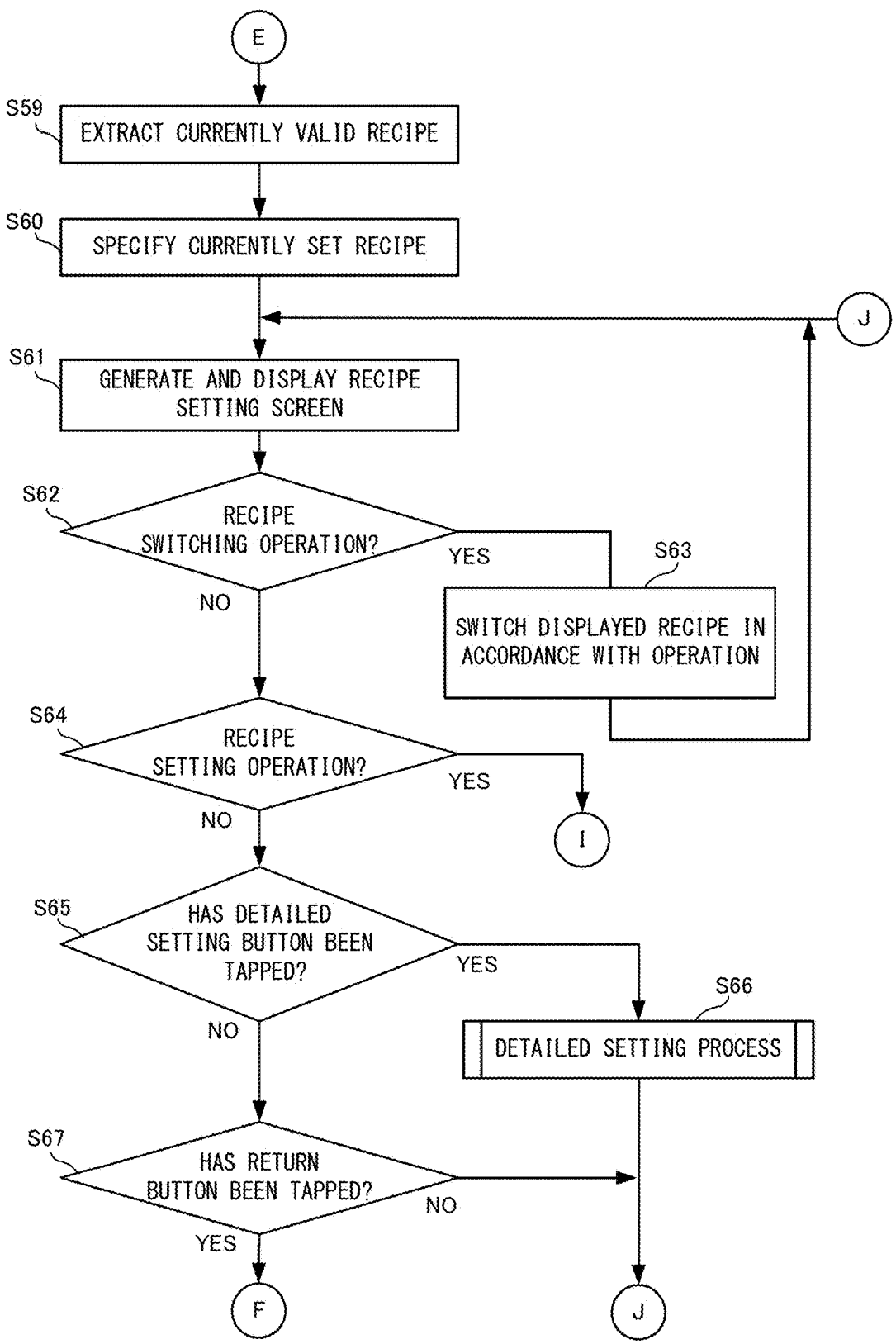
FIG. 30 is a flowchart showing the details of the alteration screen process.
Figure 31:
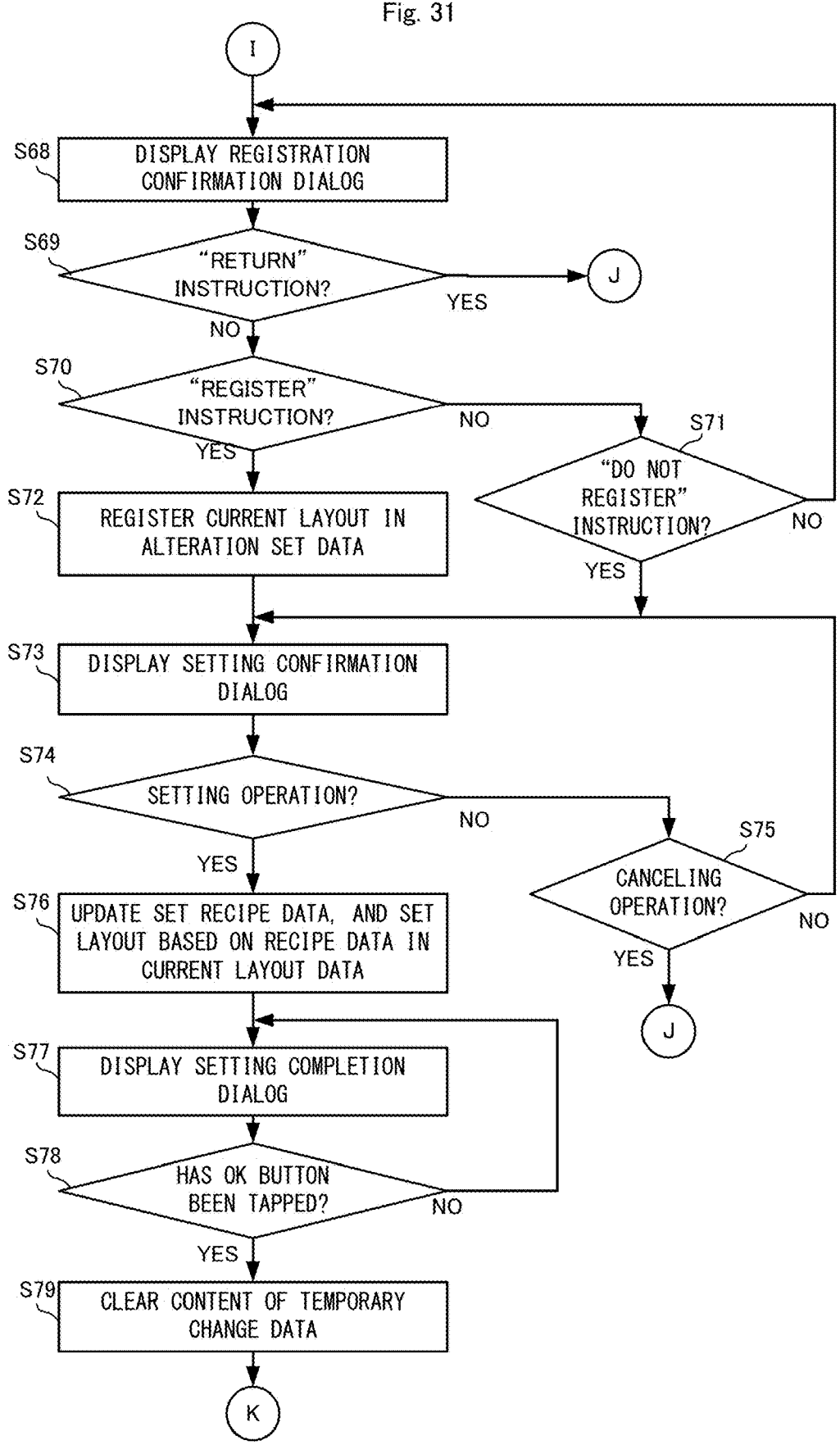
FIG. 31 is a flowchart showing the details of the alteration screen process.
Figure 32:
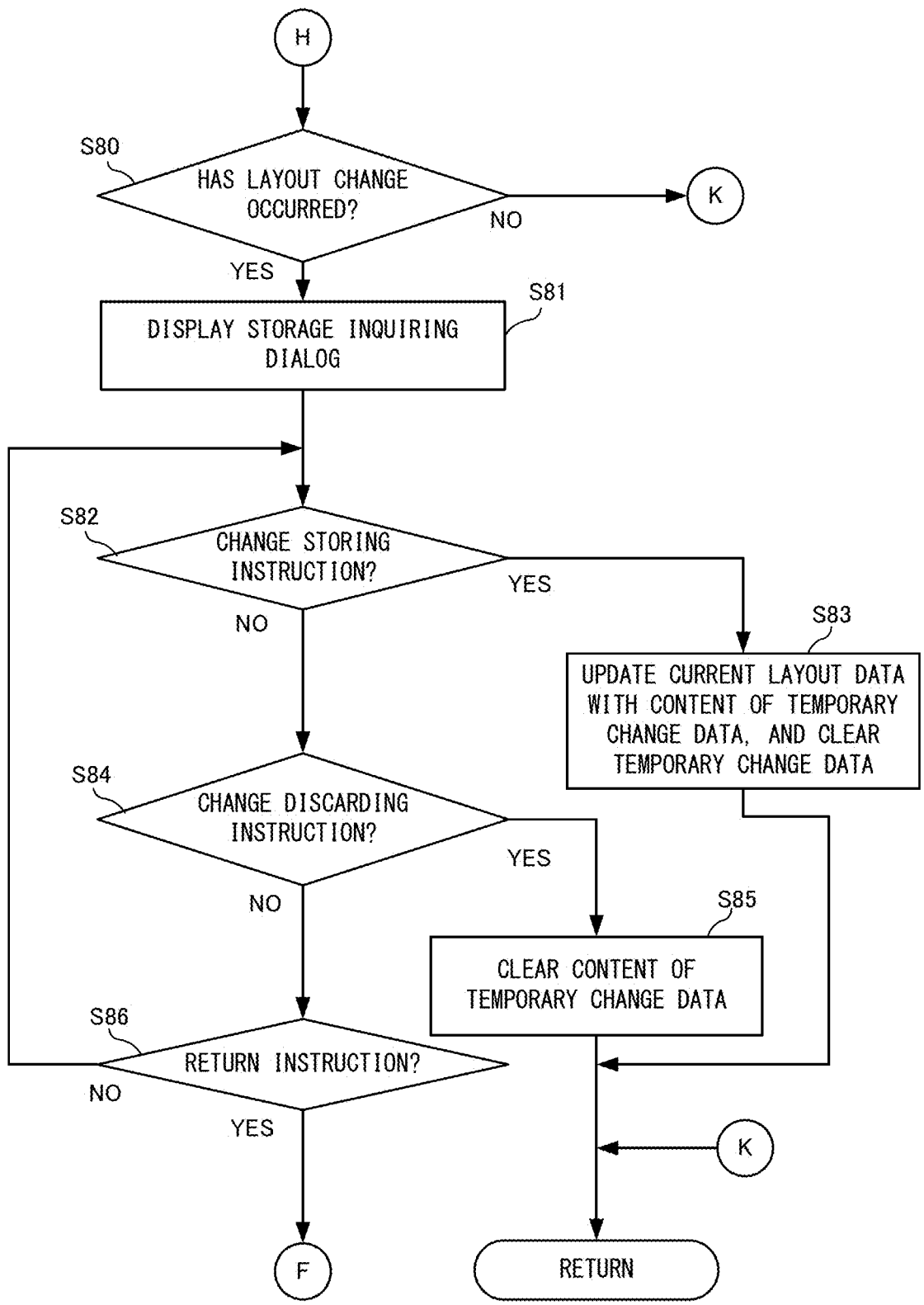
FIG. 32 is a flowchart showing the details of the alteration screen process.

Next, in step S17, the processor 111 executes an alteration screen process. This process is a process related to the alteration screen as shown in FIG. 5. FIG. 29 to FIG. 32 are each a flowchart showing the details of the alteration screen process. In FIG. 29, first, in step S51, the processor 111 acquires the current layout data 315 related to the placement target area in which the player character 201 is currently located.

Figure 33:
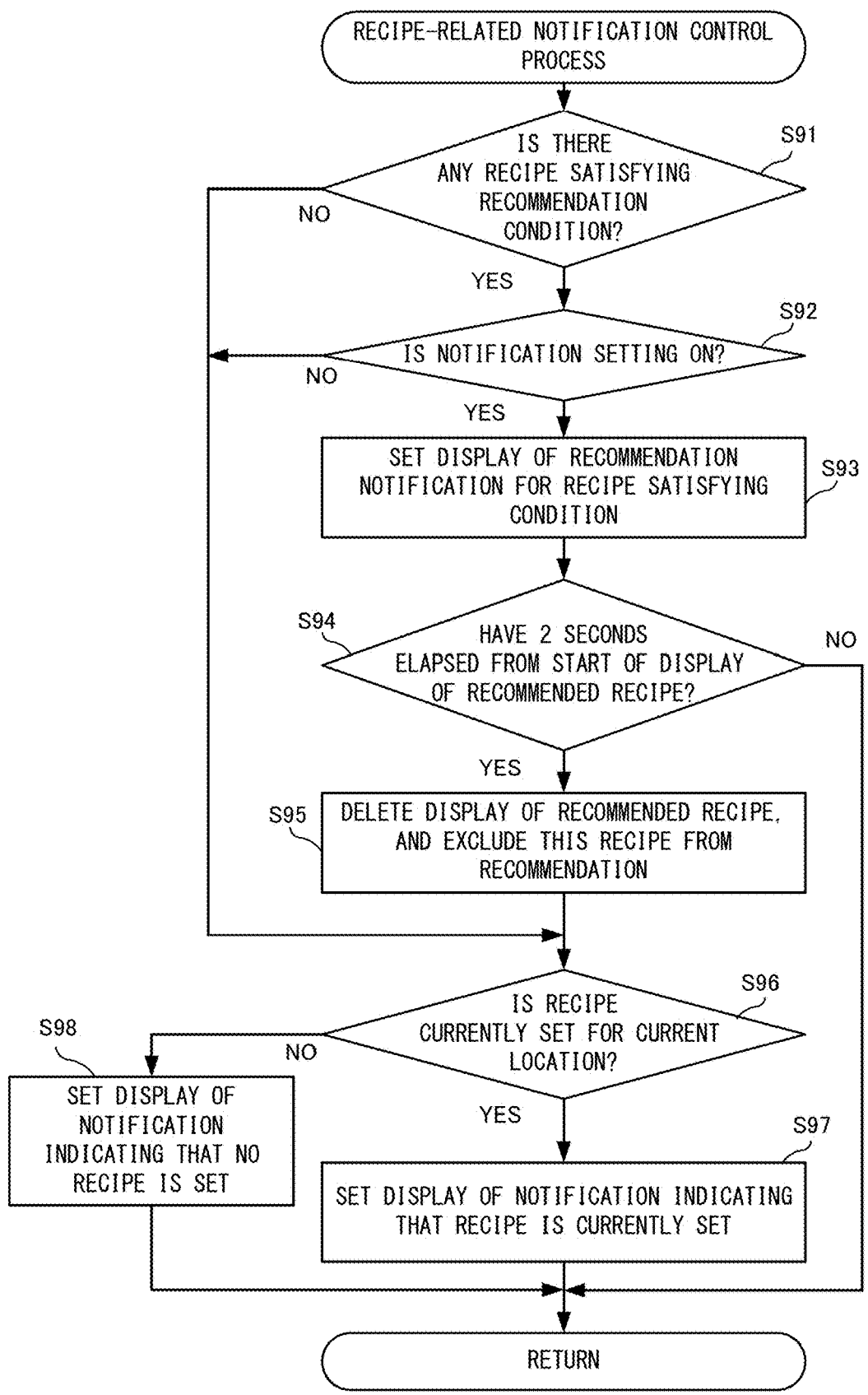
FIG. 33 is a flowchart showing the details of a second notification control process.

Next, in step S52, the processor 111 executes a recipe-related notification control process. This process is mainly a process for controlling the display content of the recipe-related notification 216. FIG. 33 is a flowchart showing the details of the recipe-related notification control process. In FIG. 33, first, in step S91, the processor 111 determines whether there is any recipe that satisfies a recommendation condition. Specifically, the processor 111 refers to the recommended recipe data 320 and the recipe data 405 and extracts any recipe that has not been recommended yet and that is within a valid period. Then, the processor 111 determines whether there is any recipe that satisfies the recommendation condition as described above, among the extracted recipes, on the basis of the recommendation condition data 436 of each recipe. As a result of the determination, if there is any recipe that satisfies the recommendation condition (YES in step S91), in step S92, the processor 111 determines whether recommendation notification setting has been set to be ON, on the basis of the recipe-related notification setting data 318. As a result of the determination, if the notification setting is not ON (NO in step S92), the processor 111 advances the processing to step S96 described later. On the other hand, if the notification setting is ON (YES in step S92), in step S93, the processor 111 performs display setting such that (a preview image of) the recipe that satisfies the recommendation condition is displayed as a recommended recipe in the recipe-related notification 216. If there are a plurality of recommended recipes, preview images of these recommended recipes may be displayed simultaneously, or may be switched and displayed one by one in a predetermined order.

Next, in step S94, the processor 111 determines whether 2 seconds have elapsed after the display of the notification of the recommended recipe is started. As a result of the determination, if 2 seconds have not elapsed (NO in step S94), the processor 111 ends the recipe-related notification control process. Accordingly, the display of the notification of the recommended recipe continues for 2 seconds. On the other hand, if 2 seconds have elapsed (YES in step S94), in step S95, the processor 111 deletes the display of the recommended recipe notification. Furthermore, the processor 111 registers the recipe ID 431 of the recommended recipe in the recommended recipe data 320. Accordingly, the recipe is not notified as a recommended recipe thereafter.

On the other hand, as a result of the determination in step S91, if there is no recipe that satisfies the recommendation condition (NO in step S91), the processes in steps S92 to S95 are skipped, and the processor 111 advances the processing to the next step S96.

Next, in step S96, the processor 111 determines whether a recipe has been set for the placement target area in which the player character 201 is currently located, on the basis of the set recipe data 316. As a result of the determination, if a recipe is currently set (YES in step S96), in step S97, the processor 111 performs setting such that a notification indicating that the recipe is currently set (see FIG. 7) is displayed in the recipe-related notification 216. On the other hand, if no recipe is set (NO in step S96), in step S98, the processor 111 performs setting such that a notification indicating that no recipe is set (see FIG. 6) is displayed in the recipe-related notification 216. Thereafter, the processor 111 ends the recipe-related notification control process.

Referring back to FIG. 29, next, in step S53, the processor 111 generates an alteration screen as shown in FIG. 5, on the basis of the current layout data 315 and the processing result of the recipe-related notification control process, and displays the generated alteration screen on the display section 116. Then, the processor 111 waits for an operation from the user.

Next, in step S54, the processor 111 determines whether an operation for changing the placement layout has been performed, on the basis of the operation data 406. This determination is performed, for example, on the basis of whether a drag operation has been performed on a predetermined placement item. As a result of the determination, if an operation for changing the placement layout has been performed (YES in step S54), in step S55, the processor 111 changes the placement position of the placement item on the basis of the content of the changing operation. Furthermore, the processor 111 stores the changed placement layout in the temporary change data 407.

Next, in step S56, the processor 111 generates an alteration screen on the basis of the temporary change data 407, and displays the generated alteration screen on the display section 116. Thereafter, the processor 111 returns to step S54 and repeats the process. That is, until the placement layout is manually changed and the change is finalized, an alteration screen based on the temporary change data 407 is generated.

Processing Related to Recipe Setting Screen

Next, the case where, as a result of the determination in step S54, the operation content is not an operation for changing the placement layout, will be described In this case (NO in step S54), in step S57, the processor 111 determines whether a tap operation has been performed on the "suggested recipe" button 214. As a result of the determination, if a tap operation has been performed on the "suggested recipe" button 214 (YES in step S57), the processor 111 executes processing related to the recipe setting screen as described above. First, in step S59 in FIG. 30, the processor 111 extracts a recipe that is targeted for the placement target area in which the player character 201 is currently located and that is currently valid, from the recipe data 405.

Next, in step S60, the processor 111 refers to the set recipe data 316 and determines whether or not there is a currently set recipe. Then, if there is a currently set recipe, the processor 111 specifies this recipe.

Next, in step S61, the processor 111 generates a recipe setting screen as shown in FIG. 9, on the basis of the extracted currently valid recipe and the currently set recipe, and displays the generated recipe setting screen on the display section 116. In the exemplary embodiment, if there is a currently set recipe, the processor 111 generates a recipe setting screen in which the recipe name display 222 and the preview image 221 related to the currently set recipe are displayed as initial values. If there is no currently set recipe, the processor 111 generates, for example, a recipe setting screen in which the recipe name display 222 and the preview image 221 of a newest distributed recipe are initially displayed. As for the preview image, display setting is performed such that a plurality of the preview images 221 are sequentially switched and displayed as described above with reference to FIG. 10 to FIG. 12.

Next, in step S62, the processor 111 determines whether a recipe switching operation has been performed, on the basis of the operation data 406. For example, the processor 111 determines whether a slide operation in the right-left direction has been performed on the display region of the preview image 221. As a result of the determination, if a recipe switching operation has been performed (YES in step S62), in step S63, the processor 111 switches the displayed recipe (the preview image 221 and the recipe name display 222) in accordance with the operation content. In addition, at this time, the processor 111 also changes the display form (text content, etc.) of the recipe setting button 223 as described above, in accordance with whether the displayed recipe is a "currently set" recipe. Thereafter, the processor 111 returns to step S61 and repeats the process.

On the other hand, as a result of the determination in step S62, if a recipe switching operation has not been performed (NO in step S62), in the next step S64, the processor 111 determines whether a recipe setting operation has been performed, specifically, a tap operation has been performed on the recipe setting button 223. As a result of the determination, if a tap operation has been performed on the recipe setting button 223 (YES in step S64), the processor 111 executes various confirmation processes associated with the recipe setting. Specifically, first, in step S68 in FIG. 31, the processor 111 displays the registration confirmation dialog 231 as shown in FIG. 13 and waits for an operation of the user. Next, in step S69, the processor 111 determines whether a tap operation has been performed on the "return" button 234 in response to the registration confirmation dialog 231, on the basis of the operation data 406. If a tap operation has been performed on the "return" button 234 (YES in step S69), the registration confirmation dialog 231 is deleted, and the processor 111 returns to step S61 and repeats the process. On the other hand, if a tap operation has not been performed on the "return" button 234 (NO in step S69), in step S70, the processor 111 determines whether a registration instruction operation has been performed, specifically, a tap operation has been performed on the "register" button 232. As a result of the determination, if a registration instruction operation has been performed (YES in step S70), in step S72, the processor 111 registers information indicating the current placement layout, in the alteration set data 319. Thereafter, the processor 111 advances the processing to step S73 described later.

On the other hand, as a result of the determination in step S70, if a registration instruction operation has not been performed (NO in step S70), in step S71, the processor 111 determines whether an operation for an instruction not to register has been performed, specifically, a tap operation has been performed on the "do not register" button 233. As a result of the determination, if an operation for an instruction not to register has been performed (YES in step S71), the processor 111 advances the processing to step S73 described later. On the other hand, if an operation for an instruction not to register has also not been performed (NO in step S71), the processor 111 returns to step S68 and repeats the process.

After the processing related to the registration confirmation dialog 231 ends, next in step S73, the processor 111 displays the setting confirmation dialog 241 as shown in FIG. 14 and waits for an operation of the user. Subsequently, in step S74, on the basis of the operation data 406, the processor 111 determines whether a recipe setting operation has been performed, specifically, a tap operation has been performed on the "set" button 243. As a result of the determination, if a recipe setting operation has been performed (YES in step S74), in step S76, the processor 111 updates the set recipe data 316. That is, the processor 111 sets the recipe ID 431 of the recipe that is instructed to be set this time, as the set recipe ID 342 for the current placement target area. Furthermore, the processor 111 clears the current layout data 315 once, and then sets the placement layout based on the recipe data of the recipe that is instructed to be set this time, in the current layout data 315. Thereafter, the processor 111 advances the processing to step S77.

On the other hand, as a result of the determination in step S74, if a recipe setting operation has not been performed (NO in step S74), in step S75, the processor 111 determines whether a canceling operation for the setting confirmation dialog 241 has been performed, specifically, a tap operation has been performed on the "cancel" button 242. As a result of the determination, if a canceling operation has not been performed (NO in step S75), the processor 111 returns to step S73 and repeats the process. If a canceling operation has been performed (YES in step S75), the setting confirmation dialog 241 is deleted, and the processor 111 returns to step S61 and repeats the process.

Next, in step S77, the processor 111 displays the setting completion dialog 251 as shown in FIG. 15 and waits for an operation from the user. Subsequently, in step S78, the processor 111 determines whether a tap operation has been performed on the OK button 252 of the setting completion dialog 251, on the basis of the operation data 406. If such an operation has not been performed (NO in step S78), the processor 111 returns to step S77 and repeats the process. If such an operation has been performed (YES in step S78), in step S79, the processor 111 clears the temporary change data 407. Thereafter, the processor 111 ends the alteration screen process.

Processing of Detailed Setting Screen in Recipe Setting Screen

Figure 34:
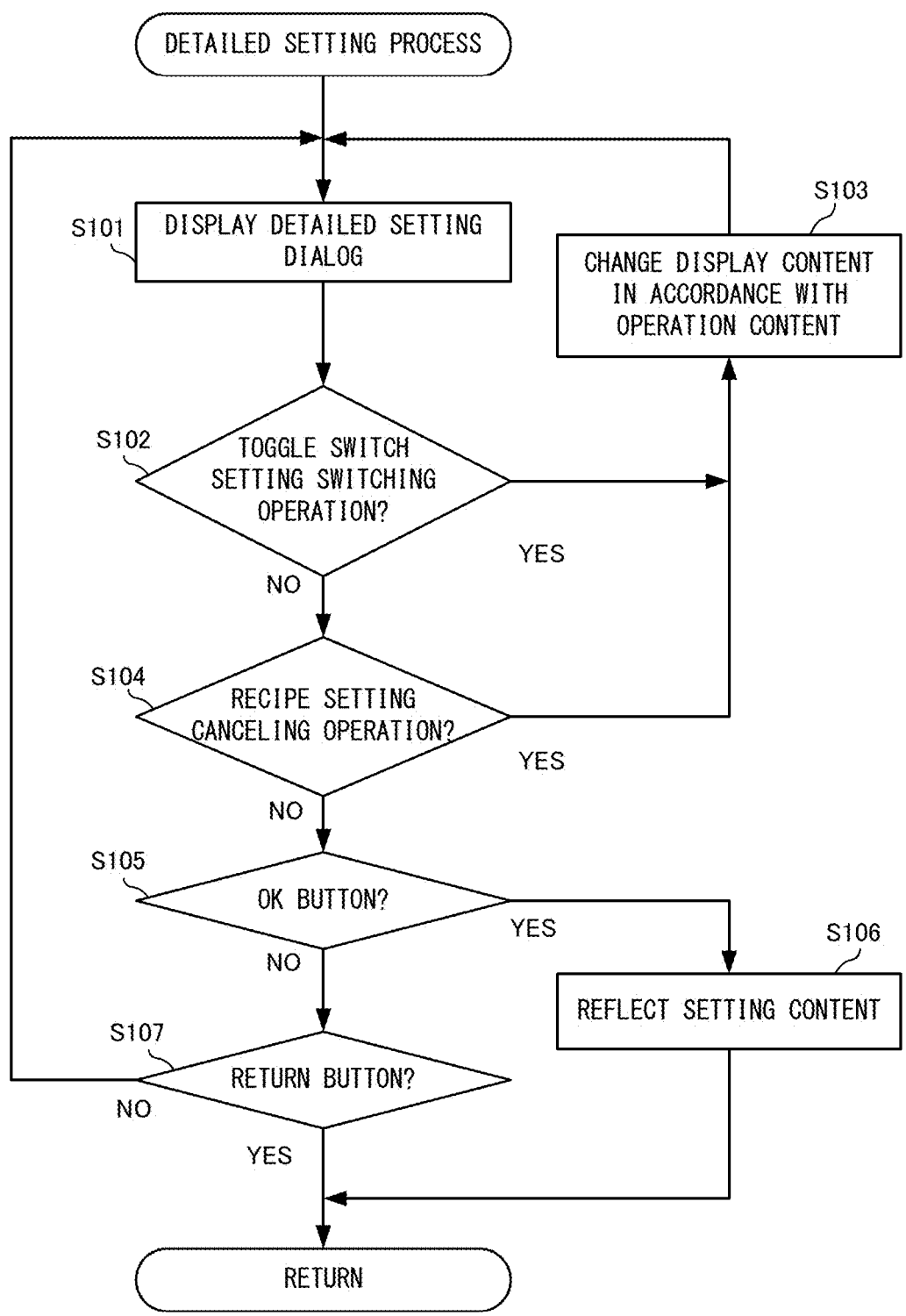
FIG. 34 is a flowchart showing the details of a detailed setting process.

Referring back to FIG. 30, next, processing in the case where it is determined in step S64 that a recipe setting operation has not been performed, will be described. In this case (NO in step S64), in step S65, the processor 111 determines whether a tap operation has been performed on the detailed setting button 225. As a result, if the detailed setting button 225 has been tapped (YES in step S65), in step S66, the processor 111 executes a detailed setting process. This process is a process related to the detailed setting dialog 261 shown in FIG. 16. FIG. 34 is a flowchart showing the details of the detailed setting process. In FIG. 34, first, in step S101, the processor 111 displays the detailed setting dialog 261 as shown in FIG. 16 and waits for an operation of the user. At this time, the display content thereof is determined on the basis of the set recipe data 316, the balloon type notification setting data 317, and the recipe-related notification setting data 318. In particular, the cancellation button 264 is set such that when no recipe is set, the text "no recipe is set" is displayed and an operation on the cancellation button 264 is not accepted.

Next, in step S102, the processor 111 determines whether a switching operation for the set content in the first toggle switch 262 or the second toggle switch 263 has been performed, on the basis of the operation data 406. As a result of the determination, if a switching operation has been performed (YES in step S102), in step S103, the processor 111 changes the display content of the first toggle switch 262 or the second toggle switch 263 (changes the ON/OFF display) in accordance with the operation content. Thereafter, the processor 111 returns to step S101 and repeats the process.

On the other hand, if such a switching operation has not been performed (NO in step S102), next, in step S104, the processor 111 determines whether a tap operation has been performed on the cancellation button 264. As a result, if a tap operation has been performed on the cancellation button 264 (YES in step S104), in step S103, the processor 111 changes the display content of the cancellation button 264 in accordance with the operation content. Specifically, the processor 111 changes the text of the cancellation button 264 from "cancel recipe" to "no recipe is set". Furthermore, the processor 111 performs setting such that the cancellation button 264 does not accept a tap operation.

On the other hand as a result of the determination in step S104, if a tap operation has not been performed on the cancellation button 264 (NO in step S104), in step S105, the processor 111 determines whether a tap operation has been performed on the OK button 266 of the detailed setting dialog 261. If a tap operation has been performed on the OK button 266 (YES in step S105), in step S106, the processor 111 reflects the current setting contents of the first toggle switch 262, the second toggle switch 263, and the cancellation button 264 in the balloon type notification setting data 317, the recipe-related notification setting data 318, and the set recipe data 316, respectively. Thereafter, the processor 111 deletes the detailed setting dialog 261 and ends the detailed setting process.

On the other hand, as a result of the determination in step S105, if a tap operation has not been performed on the OK button 266 (NO in step S105), in step S107, the processor 111 determines whether a tap operation has been performed on the return button 265. If a tap operation has also not been performed on the return button 265 (NO in step S107), the processor 111 returns to step S101 and repeats the process. If a tap operation has been performed on the return button 265 (YES in step S107), the processor 111 deletes the detailed setting dialog 261 and ends the detailed setting process. In this case, the change content in the detailed setting dialog 261 is discarded. Therefore, at this time, a confirmation message indicating that the display content is to be discarded, or the like may be displayed.

Referring back to FIG. 30, after the detailed setting process in step S66 ends, the processor 111 returns to step S61 and repeats the process.

On the other hand, as a result of the determination in step S65, if a tap operation has not been performed on the detailed setting button 225 (NO in step S65), in step S67, the processor 111 determines whether a tap operation has been performed on the return button 224 in the recipe setting screen. As a result, if a tap operation has not been performed on the return button 224 (NO in step S67), the processor 111 returns to step S61 and repeats the process. On the other hand, if a tap operation has been performed on the return button 224 (YES in step S67), the processor 111 returns to step S54 and repeats the process.

Referring back to FIG. 29, next, the case where, as a result of the determination in step S57, a tap operation has not been performed on the "suggested recipe" button 214, will be described. In this case (NO in step S57), in step S58, the processor 111 determines whether a tap operation has been performed on the end button 212, on the basis of the operation data 406. As a result of the determination, if a tap operation has not been performed on the end button 212 (NO in step S58), the processor 111 returns to step S54 and repeats the process. If a tap operation has been performed on the end button 212 (YES in step S58), a process related to manually storing the layout change content is executed. Specifically, first, in step S80 in FIG. 32, the processor 111 determines whether placement layout change has occurred. This determination is performed, for example, on the basis of whether a certain placement layout has been stored in the temporary change data 407. As a result of the determination, if placement layout change has not occurred (NO in step S80), the processor 111 ends the alteration screen process. On the other hand, if placement layout change has occurred (YES in step S80), in step S81, the processor 111 displays a dialog for inquiring whether to store the changed layout and waits for an operation of the user. Although not shown, for example, a "store and end" button for a change storing instruction, a "return and end" button for a change discarding instruction, and a "return" button for returning to the previous screen are displayed in this dialog.

Next, in step S82, the processor 111 determines whether a change storing instruction has been made for the dialog for inquiring about storing, on the basis of the operation data 406. If a change storing instruction has been made (YES in step S82), in step S83, the processor 111 updates the current layout data 315 with the content of the temporary change data 407. Furthermore, the processor 111 clears the temporary change data 407. Here, if manual placement has been performed and the change has been stored in a state where a recipe is currently set (the automatic placement mode is ON), the processor 111 sets the automatic placement mode to be OFF. That is, in such a case, the processor 111 sets "000" to the set recipe ID 342 of the set recipe data 316. For example, it is assumed that in a state where the recipe A is currently set for the campsite area, the placement layout based on the recipe A is completed up to 80%. In this case, when the user performs a manual placement operation for the layout to further change the layout and stores the change, the setting of the recipe A is canceled. As examples of such changes, the case where a placed placement item is slightly changed, the case where some placement items are replaced with other placement items (not specified by the recipe), and the case where a new placement item is additionally placed, are conceivable. When the above process ends, the processor 111 ends the alteration screen process.

On the other hand, if a change storing instruction has not been performed (NO in step S82), in step S84, the processor 111 determines whether a change discarding instruction has been made. If a change discarding instruction has been made (YES in step S84), in step S85, the processor 111 clears the temporary change data 407. Then, the processor 111 ends the alteration screen process.

On the other hand, as a result of the determination in step S84, if a change discarding instruction has not been made (NO in step S84), in step S86, the processor 111 determines whether an instruction to "return" to the previous screen has been made. As a result, if an instruction to "return" to the previous screen has been made (YES in step S86), the processor 111 returns to step S54 and repeats the process. On the other hand, if an instruction to "return" to the previous screen has not been made (NO in step S86), the processor 111 returns to step S82 and repeats the process.

This is the end of the description of the alteration screen process.

Referring back to FIG. 26, after the alteration screen process ends, next, in step S18, the processor 111 executes an automatic placement process. That is, when the screen transitions from the alteration screen to the area screen, the automatic placement process is executed. This process is the same as the process in step S6, and thus the description thereof is omitted. For example, in a state where a predetermined recipe is currently set, if the alteration screen process is executed but the alteration screen process is terminated without making any changes, and a new placement item is given at a timing when the alteration screen is opened, the new placement item can be automatically placed by the automatic placement process when the alteration screen is closed and the screen transitions to the area screen.

Next, in step S19, the processor 111 generates an area image related to the area in which the player character 201 is currently located. In addition, if this area is a placement target area, an area image based on the current layout data 315 corresponding to this area is generated. At this time, if a recipe has newly been set in the alteration screen process, since the placement layout based on this recipe has been set in the current layout data 315, an area image of the placement layout based on this recipe is generated. Thereafter, the processor 111 advances the processing to step S9.

Next, processing in the case where, as a result of the determination in step S10 in FIG. 26, the icon 205B has not been tapped, will be described. In this case (NO in step S10), in step S20, the processor 111 executes various kinds of game processing other than the above-described processing on the basis of the operation content indicated by the operation data 406. Then, the processor 111 generates a game image in which the result of the game processing is reflected, and displays the generated game image on the display section 116. Thereafter, the processor 111 returns to step S2 and repeats the process. If an operation for ending the game has been performed in step S20, the game processing according to the exemplary embodiment is terminated.

This is the end of the detailed description of the game processing of the exemplary embodiment.

As described above, in the exemplary embodiment, if a recipe is set in advance, when the user merely acquires a distribution item specified by the recipe, this item is automatically placed on the basis of the recipe without performing a placement operation. Accordingly, the convenience of the user can be improved.

Moreover, if a recipe is created so as to be associated with a predetermined event, it is possible to increase the motivation of the user to take part in the event. For example, the case where an event in which a predetermined placement item group is available is held for a limited time, is assumed. In this case, the valid period of a recipe using the predetermined placement item group may be set to be the same as the event holding period. Then, if the user "sets" the recipe in advance, when the user merely acquires a placement item for the event during the event period, automatic placement of the placement item is performed. Accordingly, the time and effort of the user for performing a placement operation each time the user newly acquires a placement item can be omitted. The omission of such time and effort also makes it possible to increase the motivation of the user to actively take part in the event. In addition, it is also possible to prevent an acquired placement item from being left unplaced. In the exemplary embodiment, while merely concentrating on playing the game related to the event, the user can acquire a predetermined placement item, and the placement layout of the campsite area or the like is automatically completed. Therefore, it is possible to increase the motivation of the user to acquire a predetermined distribution item through the event, and eventually to increase the motivation of the user to take part in the event.

Modifications

In the above embodiment, when setting a recipe, the existing placement layout is discarded once. In this regard, in another exemplary embodiment, if there is no interference (overlap) of placement positions between the placement layout based on the recipe and the existing placement layout, both placement layouts may be made to coexist without discarding the existing placement layout. In addition, even if there is interference of placement positions, control in which only the placement item related to the interfering position is removed from the existing layout may be performed.

In the above embodiment, as for the timing to execute the automatic placement process, the example in which the automatic placement process is executed when the screen transitions to the placement target area has been described. The timing is not limited thereto, and in another exemplary embodiment, the automatic placement process may be executed at another timing. For example, the automatic placement process (corresponding process) may be executed immediately at the timing when a predetermined recipe is set in the recipe setting screen.

As for the recipe recommendation notification, in another exemplary embodiment, when the number of recipes that can be set becomes equal to or larger than a predetermined number, notification for promoting the user to use any of the recipes may be performed. For example, the case where the number of recipes that can be set becomes equal to or larger than a predetermined number at a certain timing, for example, due to overlap of the holding period of an event based on a seasonal factor (for example, Halloween, Christmas, etc.) and the holding period of a so-called "collaboration" event, is also conceivable. In such a case, for example, if the user has not set any recipe yet, a recipe selected at random or according to a predetermined condition may be presented to the user along with a notification message such as "Why don't you use a recipe?". Accordingly, it is possible to provide an opportunity for the user to use the automatic placement function as described above.

In the above embodiment, in the alteration screen, whether or not a recipe is currently set is notified to the user by using the recipe-related notification 216. In another exemplary embodiment, a content equivalent to this notification may be notified in the area screen.

In the above embodiment, as for the recipes, the example in which the same content is distributed from the server 101 to all the users has been described. Therefore, the recipes that can be used at a predetermined timing are the same (common) among all the users. The present disclosure is not limited thereto, and in another exemplary embodiment, different contents may be able to be acquired by each user as an achievement reward or a performance reward of a predetermined condition or the like in the game. In this case, there may be differences in the recipes that can be used at a predetermined timing between the users.

In the above embodiment, the game system in which the server 101 and each information processing apparatus 102 communicate with each other has been described as an example. However, in another exemplary embodiment, the above game processing may be performed only by the information processing apparatus 102. That is, various kinds of data stored in the above-described server 101 may be stored in the information processing apparatus 102, and the game processing may be performed in a so-called stand-alone format in which the above-described processing is completed only by the information processing apparatus 102.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A processor-readable non-transitory storage medium having stored therein an information processing program to be executed by a processor of an information processing apparatus, the information processing program comprising instructions configured to cause the processor to:
   update, based on a user satisfying a predetermined acquisition condition, a state of a placement object capable of being placed in a placement target area to a state where the placement object is acquired by the user;
   select, based on an input operation performed by the user, a placement pattern that is associated with an object type, which includes the placement object, the placement pattern defining at least a target position within in the placement target area of a virtual space;
   set, based on selection of the placement pattern, an automatic placement mode to an ON state;
   based on the automatic placement mode being set into the ON state, remove the placement object from the placement target area; and
   while the automatic placement mode is in the ON state, determine that the placement object has been placed in the placement target area through a manual placement operation performed by the user, wherein the manual placement operation includes selection, based on input provided by the user, of the placement object to be placed in the placement target area and placement of the selected placement object at a position, which is designated by the user, within the placement target area;
   set the automatic placement mode to an OFF state based on the determination that the placement object has been placed into the placement target area through the manual placement operation; and
   while the automatic placement mode is set to the ON state, automatically place, using the placement pattern that is associated type of the placement object, the placement object at the target position within the placement target area without relying upon the manual placement operation being performed by the user.

2. The storage medium according to claim 1, wherein the placement pattern is one of a plurality of placement patterns that are selectable, wherein the instructions further are configured to cause the processor to:
   switch the automatic placement mode between ON and OFF in accordance with selection of any one of the plurality of placement patterns.

3. The storage medium according to claim 1, wherein the instructions further are configured to cause the processor to:
   store a predetermined valid period for each of a plurality of plurality of placement patterns.

4. The storage medium according to claim 1, wherein the instructions further are configured to cause the processor to:

perform a first notification on the basis of a new placement pattern becoming selectable by the user.

5. The storage medium according to claim 1, wherein setting of the automatic placement mode to the ON state is further based on a level attribute associated with the user, wherein the level attribute increases in accordance with progress of a game.

6. The storage medium according to claim 1, wherein the instructions further are configured to cause the processor to: store a type and a placement position of an in-game object that has been removed in association with the user.

7. The storage medium according to claim 1, wherein the instructions further are configured to cause the processor to: based on automatic placement mode being in the ON state, perform a second notification indicating to the user that the automatic placement mode is in the ON state.

8. The storage medium according to claim 1, wherein the instructions further are configured to cause the processor: based on the automatic placement mode being in the OFF state and the number of in-game objects that have not been placed being greater than a threshold, generate a recommendation prompting the user to select the placement pattern.

9. The storage medium according to claim 1, wherein the instructions further are configured to cause the processor to: based on the automatic placement mode being in the OFF state and determination that greater than a threshold percentage amount of in-game objects associated with the user have not been placed, generate a recommendation prompting the user to select the placement pattern.

10. The storage medium according to claim 1, wherein the instructions further are configured to cause the processor to: based on the automatic placement mode being in the OFF state and determination that a specific in-game object has been acquired by the user, generate a recommendation prompting the user to select a placement pattern that is associated with the specific in-game object.

11. The storage medium according to claim 1, wherein the virtual space includes at least a first area and a second area, and
the instructions further are configured to cause the processor to: place an in-game object at a position in the first area or the second area, said position being designated on the basis of a first instruction input of the user.

12. The storage medium according to claim 11, wherein the placement target area is the second area.

13. The storage medium according to claim 12, wherein the instructions further are configured to cause the processor to:
switch an area in the game on the basis of a third instruction input of the user; and
when switching to the second area, automatically place the in-game object at a position in the area.

14. The storage medium according to claim 11, wherein the instructions further are configured to cause the processor to: based on the in-game object being automatically placed in the virtual space, generate a third notification indicating that the in-game object has been automatically placed.

15. The storage medium according to claim 11, wherein the instructions further are configured to cause the processor to:
display at least a part of a plurality of the in-game objects associated with a placement pattern and any one of a plurality of preview images indicating a placement position thereof; and
switch the preview image to another preview image that is different from the preview image and in which the number of the in-game objects shown is at least larger than that in the preview image.

16. The storage medium according to claim 1, wherein the instructions further are configured to cause the processor to:
make a connection with a game server; and
acquire, from the game server, a new placement pattern and information about an in-game object associated with the new placement pattern; and
the game server limits a period in which it is possible for the processor to acquire the information, to a predetermined period.

17. The storage medium according to claim 1, wherein the instructions further are configured to cause the processor to, based on the automatic placement mode being in the OFF state, perform a fourth recommendation promoting the user to set the placement pattern causing the automatic placement mode to be ON.

18. An information processing system comprising a processor, the processor being configured to:
update, based on a user satisfying a predetermined acquisition condition, a state of a placement object capable of being placed in a placement target area to a state where the placement object is acquired by the user;
select, based on an input operation performed by the user, a placement pattern that is associated with an object type, which includes the placement object, the placement pattern defining at least a target position within the placement target area;
set, based on selection of the placement pattern, an automatic placement mode to an ON state;
based on the automatic placement mode being set into the ON state, remove the placement object from the placement target rea;
while the automatic placement mode is in the ON state, determine that the placement object has been placed in the placement target rea through a manual placement operation performed by the user, wherein the manual placement operation includes selection, based on input provided by the user, of the placement object to be placed in the placement target area and placement of the selected object at a position, which is designated by the user, within the placement target area;
set the automatic placement mode to an OFF state based on the determination that the placement object has been placed into the placement target area through the manual placement operation; and
while the automatic placement mode is set to the ON state, automatically place, using the placement pattern that associated with the type of the placement object, the placement object at the target position within placement target area without relying upon the manual placement operation being performed by the user.

19. An information processing apparatus comprising:
a processor that is coupled to electronic memory, the processor being configured to perform operations comprising:
updating, based on a user satisfying a predetermined acquisition condition, a state of a placement object capable of being placed in a placement target area to a state where the placement object is acquired by the user;
selecting, based on an input operation performed by the user, a placement pattern that is associated with an object type, which includes the placement object the placement pattern defining at least a tang at position within in the placement area;

setting, based on selection of the placement pattern, an automatic placement mode to an ON state;

based on the automatic placement mode being set into the ON state, removing the placement object from the placement target area;

while the automatic placement mode is in the ON state, determining that the placement object has been placed in the placement target area through a manual placement operation performed by the user, wherein the manual placement operation includes selection, based on input provided by the user, of the placement object to be placed in the placement target area and placement of the selected placement object at a position, which is designated by the user, within the placement target area;

setting the automatic placement mode to an OFF state based on the determination that the placement object has been placed into the placement target area through the manual placement operation; and while the automatic placement mode is set to the ON state, automatically placing, using the placement pattern that is associated with the type of the placement object, the placement object at the target position within the placement target area without relying upon the manual placement operation being performed by the user.

20. An information processing method executed by a processor of an information processing apparatus, the method comprising:

updating, based on a user satisfying a predetermined acquisition condition, a state of a placement object capable of being placed in a placement target area to a state where the placement object is acquired by the user;

selecting, based on an input operation performed by the user, a placement pattern that is associated with an object type, which includes the placement object, the placement pattern defining at least a target position within in the placement target area;

setting, based on selection of the placement pattern, an automatic placement mode to an ON state;

based on the automatic placement mode being set into the ON state, removing the placement object from the placement target area;

while the automatic placement mode is in the ON state, determining that the placement object has been placed in the placement target area through a manual placement operation performed by the user, where manual placement operation includes selection, based on input provided by the user, of the placement object to be placed in the placement target area and placement of the selected placement object at a position, which is designated by the user, within the placement target area;

setting the automatic placement mode to an OFF state based on the determination that the placement object has been placed into the placement target area through the manual placement operation; and while the automatic placer mode is set to the ON state, automatically placing, using the placement pattern that is associated with the type of the placement object, the placement object at the target position within the placement target area without relying upon the manual placement operation being performed by the user.

* * * * *